US008626210B2

(12) United States Patent
Hicks, III

(10) Patent No.: US 8,626,210 B2
(45) Date of Patent: Jan. 7, 2014

(54) METHODS, SYSTEMS, AND PRODUCTS FOR SECURITY SYSTEMS

(75) Inventor: John Alson Hicks, III, Roswell, GA (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 142 days.

(21) Appl. No.: 12/945,918

(22) Filed: Nov. 15, 2010

(65) Prior Publication Data
US 2012/0122418 A1 May 17, 2012

(51) Int. Cl.
*H04W 4/00* (2009.01)
(52) U.S. Cl.
USPC ............ 455/466; 455/8; 455/404.1; 455/418; 455/419; 455/420; 455/423; 455/445; 455/450; 455/521; 370/310.2; 370/312; 370/328; 370/351; 379/1.01; 379/33; 340/506; 340/508; 340/516
(58) Field of Classification Search
USPC .................. 455/8, 404.1, 418–420, 423, 445, 455/450–453, 466, 521; 370/310.2, 312, 370/328, 351; 379/1.01, 37; 340/506–508, 340/516
See application file for complete search history.

(56) References Cited

U.S. PATENT DOCUMENTS

| 6,038,289 | A | 3/2000 | Sands |
| 6,067,346 | A | 5/2000 | Akhteruzzaman et al. |
| 6,271,752 | B1 | 8/2001 | Vaios |
| 6,400,265 | B1 | 6/2002 | Saylor et al. |
| 6,636,489 | B1 * | 10/2003 | Fingerhut ...................... 370/328 |
| 6,829,478 | B1 * | 12/2004 | Layton et al. ................. 455/428 |
| 6,914,896 | B1 | 7/2005 | Tomalewicz |
| 6,975,220 | B1 | 12/2005 | Foodman et al. |
| 7,015,806 | B2 | 3/2006 | Naidoo et al. |
| 7,020,796 | B1 * | 3/2006 | Ennis et al. .................... 714/4.1 |
| 7,113,090 | B1 | 9/2006 | Saylor et al. |
| 7,239,689 | B2 | 7/2007 | Diomelli |
| 7,248,161 | B2 | 7/2007 | Spoltore et al. |
| 7,323,980 | B2 | 1/2008 | Faulkner et al. |
| 7,679,507 | B2 | 3/2010 | Babich et al. |
| 7,779,141 | B2 | 8/2010 | Hashimoto et al. |
| 7,853,261 | B1 | 12/2010 | Lewis et al. |
| 7,855,635 | B2 * | 12/2010 | Cohn et al. .................... 340/506 |
| 7,920,580 | B2 | 4/2011 | Bedingfield, Sr. |
| 2002/0193107 | A1 | 12/2002 | Nascimento |
| 2003/0025599 | A1 | 2/2003 | Monroe |
| 2004/0086093 | A1 | 5/2004 | Schranz |
| 2004/0177136 | A1 | 9/2004 | Chen et al. |
| 2004/0196833 | A1 | 10/2004 | Dahan et al. |
| 2005/0066033 | A1 | 3/2005 | Cheston et al. |
| 2006/0064505 | A1 | 3/2006 | Lee et al. |
| 2006/0067484 | A1 | 3/2006 | Elliot et al. |
| 2006/0239250 | A1 | 10/2006 | Elliot et al. |
| 2007/0104218 | A1 * | 5/2007 | Hassan et al. ................. 370/465 |
| 2007/0115930 | A1 | 5/2007 | Reynolds et al. |
| 2007/0226344 | A1 | 9/2007 | Sparrell et al. |
| 2008/0090546 | A1 | 4/2008 | Dickinson et al. |
| 2008/0191857 | A1 | 8/2008 | Mojaver |
| 2008/0261515 | A1 | 10/2008 | Cohn et al. |

(Continued)

*Primary Examiner* — Steve D Agosta
(74) *Attorney, Agent, or Firm* — Scott P. Zimmerman, PLLC

(57) ABSTRACT

Methods, systems, and products are disclosed for notification of alarms in security systems. A packetized alarm message is received from a security system associated with a network address. The network address is associated to a notification address. A communication to the notification address is initiated to alert of an alarm from a security system.

5 Claims, 34 Drawing Sheets

(56) References Cited

U.S. PATENT DOCUMENTS

| | | |
|---|---|---|
| 2008/0279345 A1 | 11/2008 | Zellner et al. |
| 2008/0311879 A1* | 12/2008 | Martin et al. ............... 455/404.1 |
| 2009/0017751 A1 | 1/2009 | Blum |
| 2009/0058630 A1 | 3/2009 | Friar et al. |
| 2009/0109898 A1 | 4/2009 | Adams et al. |
| 2009/0191858 A1 | 7/2009 | Calisti et al. |
| 2009/0274104 A1 | 11/2009 | Addy |
| 2010/0145161 A1 | 6/2010 | Niyato et al. |
| 2010/0281312 A1 | 11/2010 | Cohn et al. |
| 2011/0113142 A1 | 5/2011 | Rangegowda et al. |
| 2011/0197246 A1 | 8/2011 | Stancato et al. |
| 2011/0244854 A1 | 10/2011 | Hansson et al. |

* cited by examiner

METHODS, SYSTEMS, AND PRODUCTS FOR SECURITY SYSTEMS

BACKGROUND

Exemplary embodiments generally relate to communications and, more particularly, to alarm systems and to sensing conditions.

Security systems are common. When an alarm is detected, most security systems seize a phone line to call a central monitoring station. That is, a plain-told telephone system ("POTS") call is made to alert the central monitoring station of the alarm. This POTS-based security system is very reliable, but the telephone call may require more than thirty (30) seconds to set-up. Moreover, while the phone line is seized, a customer is unable to make or receive calls to other numbers—such as "911."

BRIEF DESCRIPTION OF THE SEVERAL VIEWS OF THE DRAWINGS

These and other features, aspects, and advantages of the exemplary embodiments are better understood when the following Detailed Description is read with reference to the accompanying drawings, wherein.

DETAILED DESCRIPTION

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the exemplary embodiments to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Those of ordinary skill in the art further understand that the exemplary hardware, software, processes, methods, and/or operating systems described herein are for illustrative purposes and, thus, are not intended to be limited to any particular named manufacturer.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

Figure 1:
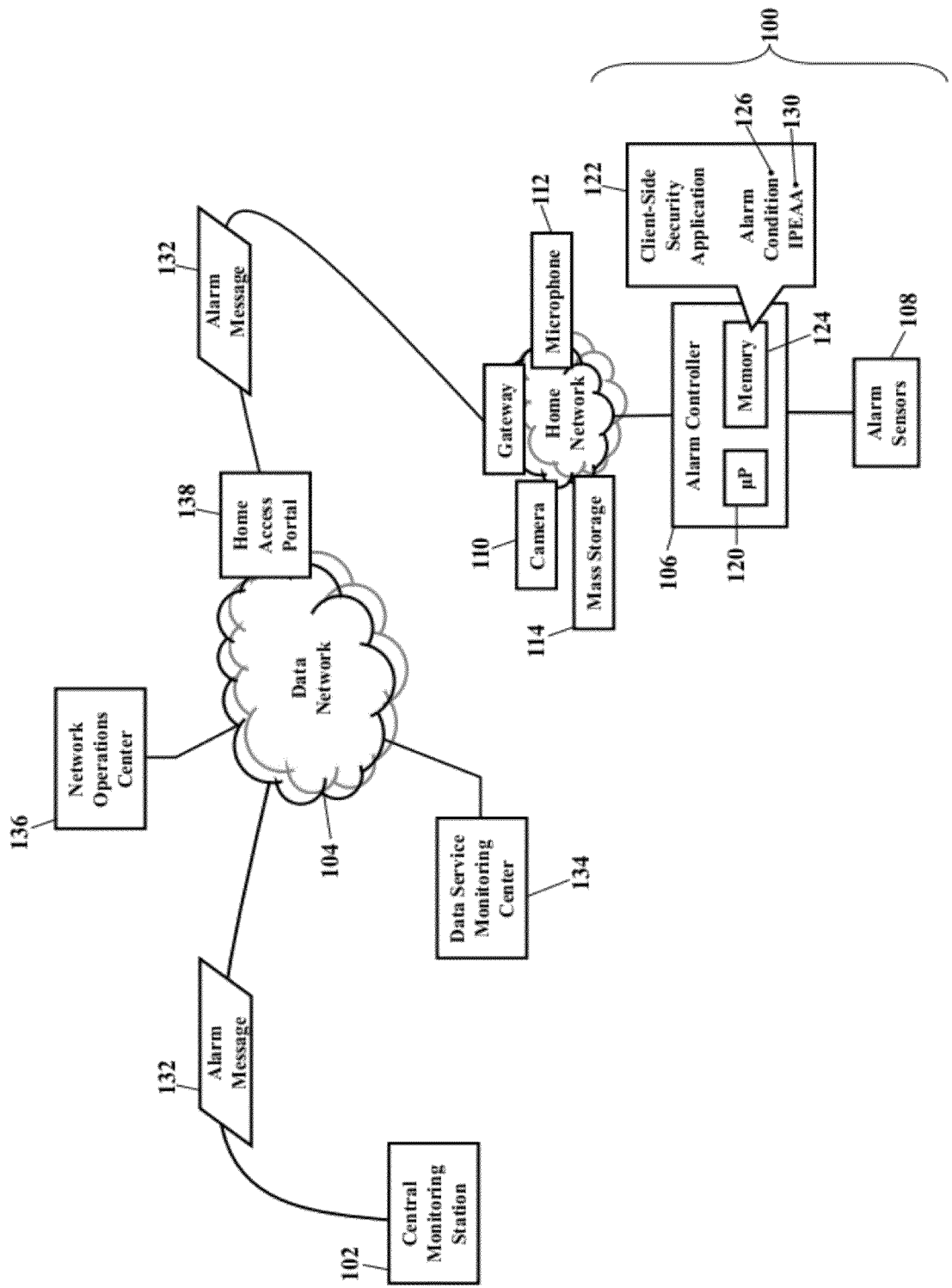
FIG. 1 is a simplified schematic illustrating an environment in which exemplary embodiments may be implemented.

FIG. 1 is a simplified schematic illustrating an environment in which exemplary embodiments may be implemented. A security system 100 communicates with a central monitoring station 102 via a packet data network 104. The security system 100 has an alarm controller 106 that receives inputs from one or more alarm sensors 108. As those of ordinary skill in the art understand, the alarm sensors 108 monitor for heat, smoke, motion, sound, or any other physical or logical parameter that may indicate a security event. The alarm controller 106 may also interface with one or more cameras 110 that capture video data and microphones 112 that capture audio data. The cameras 110 and microphones 112 may constantly capture video and audio that is automatically stored in a local mass storage device 114 (as will be later explained).

The security system 100 may be processor-controlled. As FIG. 1 illustrates, the security system 100 may include a processor 120 (e.g., "μP"), application specific integrated circuit (ASIC), or other component that executes a client-side security application 122 stored in a memory 124. The client-side security application 122 monitors the inputs, status, or state of the alarm sensors 108, the cameras 110, and/or the microphones 112. The client-side security application 122 may also instruct any of the cameras 110 and/or the microphones 112 to capture audio and/or video data. When the client-side security application 122 detects an alarm condition 126 from one of the sensors 108, the client-side security application 122 instructs the processor 120 to retrieve an IP emergency alarm address ("IPEAA") 130 from the memory 124. The IP emergency alarm address 130 is a network communications address at which the central monitoring station 102 receives packetized alarm messages from customers/subscribers of an alarm monitoring service. The IP emergency alarm address 130 may be preloaded into the memory 124, and the IP emergency alarm address 130 may be changed after a software update to the client-side security application 122.

The client-side security application 122 then generates an alarm message 132. The alarm message 132 includes data that identifies a network address associated with the security system 100 and/or the alarm controller 106. The alarm message 132 may also include data that describes the alarm condition 126, such as an alarm code associated with the sensor 108. The alarm message 132 may also include information describing the customer and/or the customer's physical street address. Whatever data is included in the alarm message 132, the data is packetized according to a packet protocol. Once the alarm message 132 is formatted and ready, the processor 120 sends the alarm message 132 to the IP emergency alarm address 130.

A data service monitoring center 134 continuously monitors data connectivity. When the client-side security application 122 detects the alarm condition 126, the alarm controller 106 must reliably connect to the data network 104 to inform the central monitoring station 102. If the alarm controller 106 cannot connect to the data network 104, then the security system 100 may have failed its function. The data service monitoring center 134 may thus constantly monitor wireless and wireline connections to the alarm controller 106. The data service monitoring center 134 may be based in the data network 104, or the data service monitoring center 134 may be a software application executed by the alarm controller 106. Regardless, the data service monitoring center 134 continuously monitors wireless and wireline data connectivity to the alarm controller 106 in the home. If communication fails between the data service monitoring center 134, the alarm controller 106, and/or the central monitoring station 102, then a trouble condition may be reported to a network operations center 136. The network operations center 136 may then undertake a diagnostic analysis to establish a root cause.

FIG. 1 also illustrates a home access portal 138. All communication with the alarm controller 106 may require authentication in the home access portal 138. Authentication may be accomplished by providing a valid user name and password. All communication towards the home passes through the home access portal 138 and then is communicated over a secure socket layer (SSL) connection to a customer's home. When the customer is away from their home and wishes to access the video cameras 110 in their home, the customer may first be authenticated by the home access portal 138. If the customer successfully authenticates, the customer's request flows over the secure socket layer (SSL) connection. Likewise, when an agent in the central monitoring center 102 wants to access the camera 110 in the home, the agent may first be authenticated by the home access portal 138. The home access portal 138 may thus provide a much higher level of security compared to having authentication occur in the alarm controller 106.

Any packet protocol is suitable. As those of ordinary skill in the art understand, sometimes information is packetized (or "framed") for use in packet data networks. The information is grouped into packets according to the packet protocol. As those of ordinary skill in the art also understand, there are many packet protocols. Some of the more well-known packet protocols include TCP/IP, IPX/SPX, AppleTalk, and SNA. Some standards organizations, such as the I.E.E.E., issue standards for packetizing data. Some networks are "mixed." That is, the network receives and handles packets of differing protocols, and a "translator" determines the particular packet protocol and the appropriate destination for each packet. Because the basics of packetizing and packet protocols are well-known, this disclosure will not further explain the packetizing of the alarm message 132.

Figure 2:
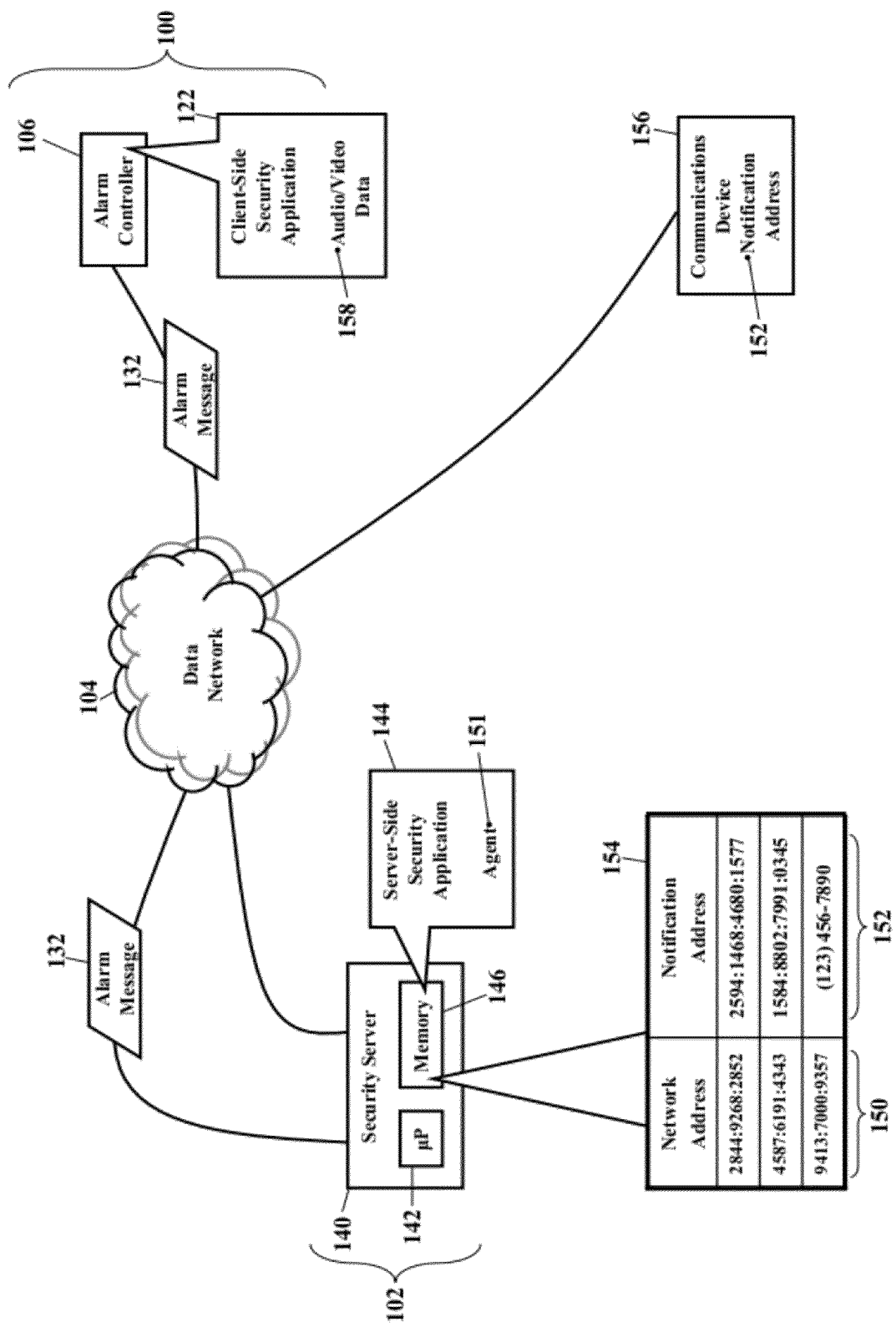
FIG. 2 is a detailed schematic illustrating receipt of the alarm message 132, according to exemplary embodiments.

FIG. 2 is a detailed schematic illustrating receipt of the alarm message 132, according to exemplary embodiments. The alarm message 132 routes from the alarm controller 106, through the data network 104, and to a security server 140 at the central monitoring station 102. The security server 140 has a processor 142 (e.g., "µP"), application specific integrated circuit (ASIC), or other component that executes a server-side security application 144 stored in a memory 146. The server-side security application 144 and the client-side security application 122 cooperate in a client-server environment to notify of alarms from the security system 100.

When the security server 140 receives the alarm message 132, the server-side security application 144 obtains any data associated with the alarm message 132. The server-side security application 144, for example, retrieves a network address 150 associated with the security system 100 and/or the alarm controller 106. The network address 150, for example, may be extracted from one or more header portions and/or payload portions of the packetized alarm message 132. However the network address 150 is received, the server-side security application 144 may then assign a human or computerized agent 151.

Because a high percentage of alarms are "false," the agent 151 may first verify the alarm. Alarms are often inadvertently triggered, such as when an owner of a home opens a door and accidentally triggers the alarm. If the agent 151 immediately summons emergency services, and the alarm is false, then local police and fire departments have wasted time and resources. Some municipalities may even impose fees for the unnecessary dispatch. The agent 151, then, may first want to verify the alarm before summoning emergency services.

The agent 151, for example, may first attempt to contact a homeowner or other responsible party. When the alarm message 132 is received, the server-side security application 144 may associate the network address 150 to a notification address 152. The notification address 152 is any telephone number, email address, and/or network communications address which is notified of alarms detected by the security system 100. The server-side security application 144, for example, queries a data table 154 that is stored in the memory 146 of the security server 140. The data table 154 maps, relates, or otherwise associates the network address 150 to the notification address 152. The server-side security application 144 retrieves the notification address 152 that is associated with the network address 150. The data table 154 only illustrates simple hexadecimal addresses, though; in practice, the addresses may be many bits and/or digits. The agent 151 may then establish communication with a communications device 156 associated with the notification address 152. The agent 151, for example, may call, email, text, or otherwise notify the communications device 156 of a security event detected by the security system 100. If the agent 151 determines that the alarm is legitimate, the agent 151 may summon emergency help.

Exemplary embodiments, therefore, allow the agent 151 to first verify the alarm condition 126. Before summoning emergency services, the agent 151 may also request and access audio/video data 158 from the cameras and/or the microphones (illustrated as reference numerals 110 and 112 in FIG. 1). The audio/video data 158 may be live, real-time data captured by the cameras 110 and/or the microphones 112. The audio/video data 158, however, may also include archived audio/video data of events preceding and succeeding the alarm condition 126. The agent 151 may then view the audio/video data 158 to help determine whether the alarm condition 126 represents a true emergency condition. If the alarm is a legitimate security concern, then the agent 151 may summon emergency help.

Figure 3:
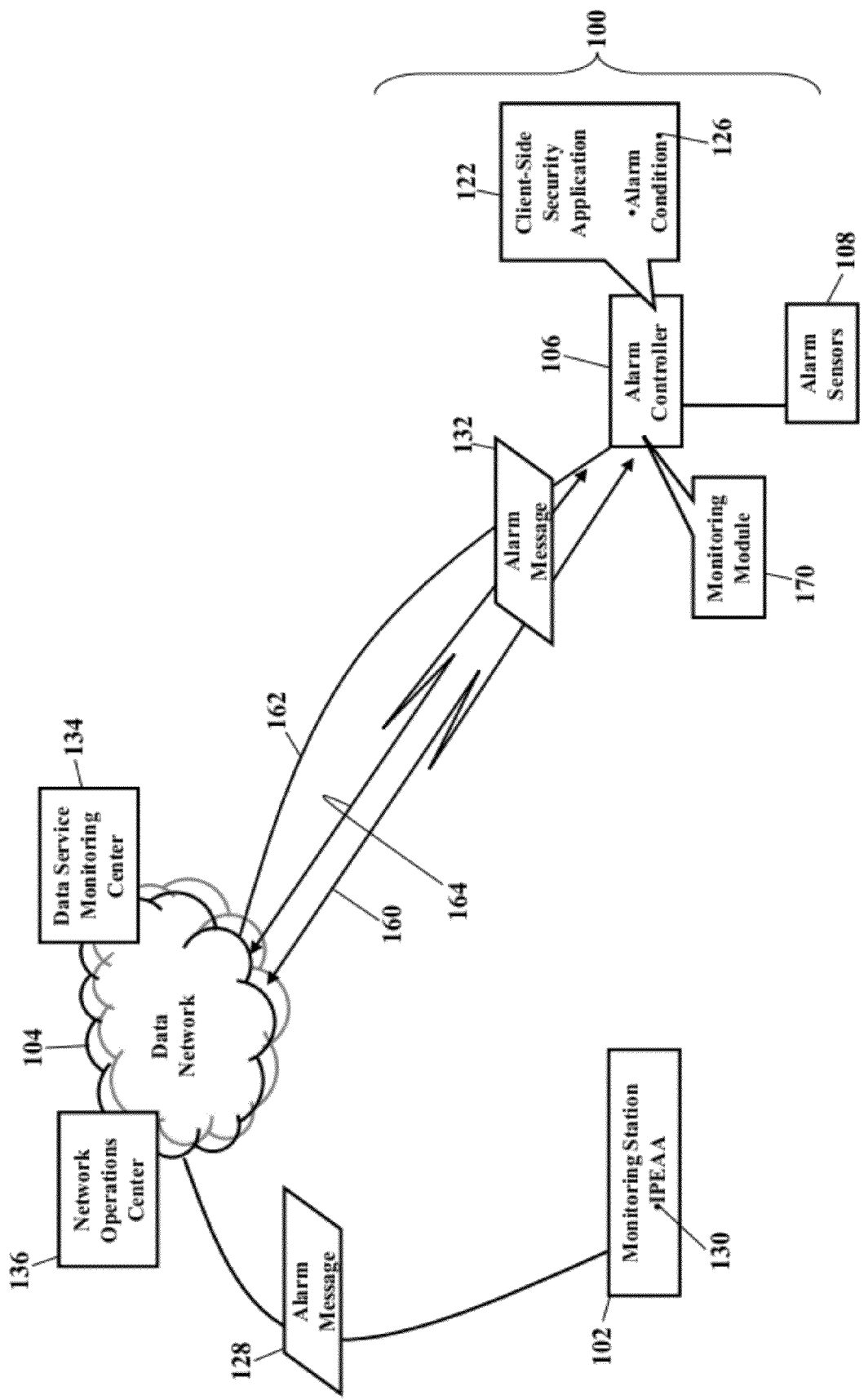
FIGS. 3-6 are more detailed schematics illustrating the exemplary embodiments.

FIGS. 3-6 are more detailed schematics illustrating the exemplary embodiments. FIG. 3 illustrates three (3) different connection mechanisms to the data network 104. When the client-side security application 122 detects the alarm condition 126 from one of the sensors 108, the client-side security application 122 must connect to the data network 104 to send the alarm message 132 to the central monitoring station 102. As FIG. 3 illustrates, the client-side security application 122 may connect to the data network 104 using any of three (3) different connection mechanisms. The client-side security application 122, for example, may connect to the data network 104 using a wireless cellular network connection 160, a wireline broadband network connection 162, and/or a short message service 164.

FIG. 3, then, illustrates different, simultaneous connections to the data network 104. The client-side security application 122 may send the alarm message 132 over the wireless cellular network connection 160 to the data network 104. The client-side security application 122 may also send the alarm message 132 over the wireline broadband network connection 162 and/or over the short message service 164. While either connection mechanism may be used, exemplary embodiments may prefer the wireless cellular network connection 160. Each cellular network is usually a proprietary network operated by, or on behalf of, a single service provider. A wireline network, however, may be operated and maintained by multiple service providers due to governmental regulations. A cellular network, then, may be a more reliable connection mechanism. The client-side security application 122 may thus prefer to send the alarm message 132 over the more reliable wireless cellular network connection 160.

FIG. 3 also illustrates the data service monitoring center 134. The data service monitoring center 134 may continuously monitor data connectivity to the alarm controller 106. The data service monitoring center 134 may interface with a monitoring module 170, according to exemplary embodiments. The monitoring module 170 may be a subroutine or software module that cooperates with the data service monitoring center 134 to monitor availability of the connection mechanisms. That is, data service monitoring center 134 and the monitoring module 170 may monitor the status of the wireless cellular network connection 160, the wireline broadband network connection 162, and the short message service 164. The data service monitoring center 134, for example, may continuously or periodically call or "ping" the monitoring module 170. If a ping over wireless and/or wireline connectivity is unsuccessful, then pinging may be repeated multiple times. If a successive number of pings do not result in a response, then a trouble condition will automatically be reported to the network operations center 136. Personnel in the network operations center 136 will then identify and isolate the trouble and restore service.

Exemplary embodiments may thus establish a hierarchy of connectivity. When the alarm condition 126 is detected, the client-side security application 122 may first determine whether the wireless cellular network connection 160 is available to the data network 104. When the wireless cellular network connection 160 is available, the client-side security application 122 routes the alarm message 132 over the wireless cellular network connection 160 to the IP emergency alarm address ("IPEAA") 130 associated with the central monitoring station 102. When, however, the wireless cellular network connection 160 is unavailable, the client-side security application 122 routes the alarm message 132 over the wireline broadband network connection 162 to the IP emergency alarm address 130. Should the wireline broadband network connection 162 be unavailable, then the client-side security application 122 may revert to the short message service 164. The client-side security application 122 may thus prioritize the connection mechanisms and first attempt communication using the wireless cellular network connection 160. If cellular data service is unavailable, a second attempt may be made over the wireline broadband network connection 162. If wireline broadband service is unavailable, then a third attempt may be made using the short message service 164.

Figure 4:
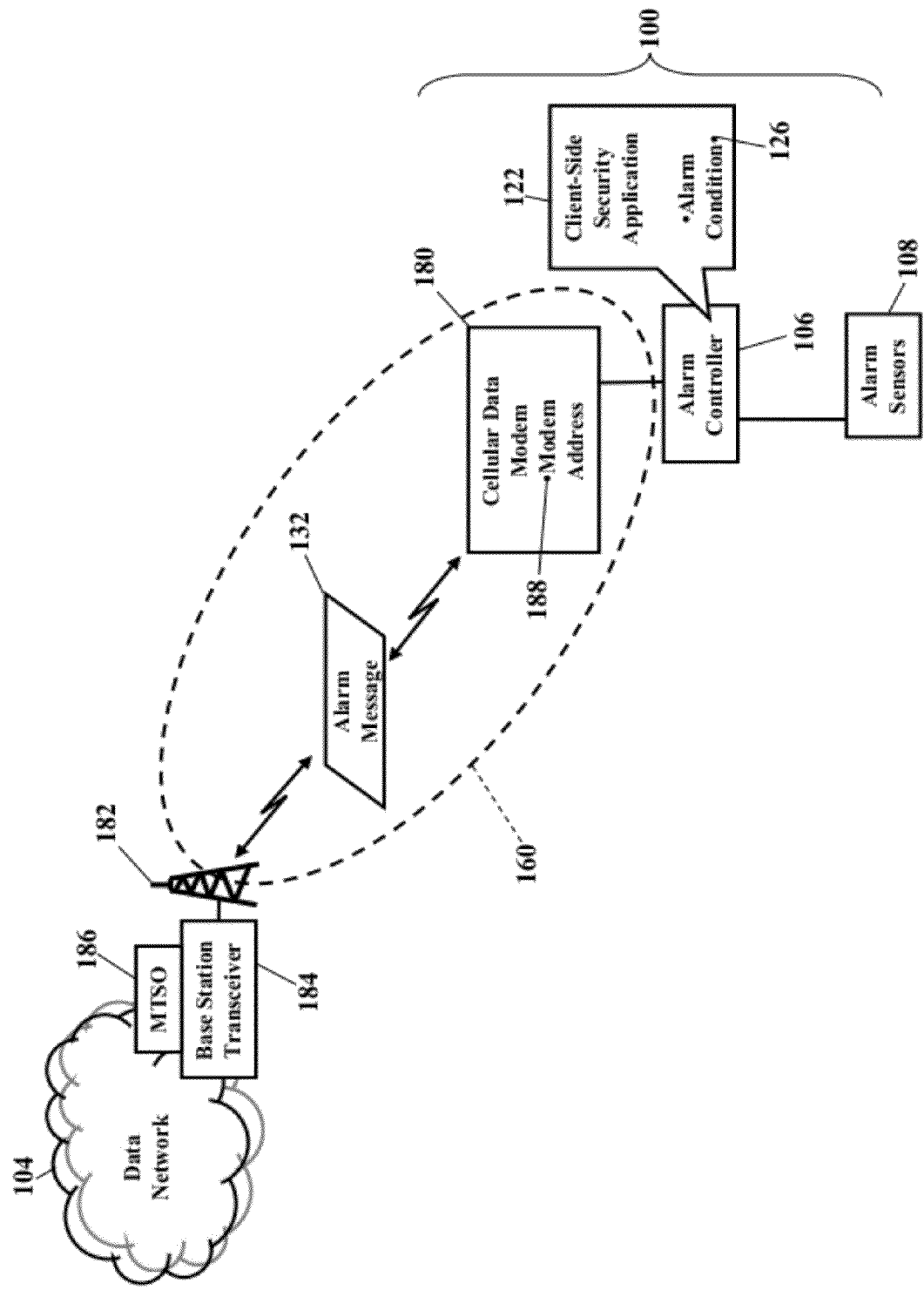

FIG. 4 is a detailed schematic illustrating the wireless cellular network connection 160, according to exemplary embodiments. The alarm controller 106 communicates with a cellular data modem 180. The cellular data modem 180 communicates with the data network 104. FIG. 4 illustrates a 3G cellular architecture, in which the cellular data modem 180 uses third generation (or "3G") cellular packet data service to communicate with the data network 104. The cellular data modem 180, for example, may utilize general packet radio service (GPRS), enhanced data rates for global evolution (EDGE), universal mobile telecommunications service (UMTS), and/or high speed packet access (HSPA). The cellular data modem 180 sends and receives data to an antenna 182 of a base station transceiver 184. The base station transceiver 184 communicates with a mobile telephone switching office ("MTSO") 186, and the mobile telephone switching office 186 has a data link to the data network 104. The cellular data modem 180 modulates and/or demodulates the signals that are received and sent via the base station transceiver 184. The cellular data modem 180 is well known to those of ordinary skill in the art, so the cellular data modem 180 need not be discussed in detail. The cellular data modem 180 may be addressable, so the cellular data modem 180 may also have a unique or shared modem address 188. When the alarm condition 126 is detected, then the client-side security application 122 may route the alarm message 132 over the wireless cellular network connection 160 to the data network 104. Exemplary embodiments, however, may utilize other cellular standards, such as fourth generation cellular data standards. Exemplary embodiments may also utilize other wireless standards, such as WI-FI®, WI-MAX®, or any of the IEEE 802 family of standards.

Figure 5:
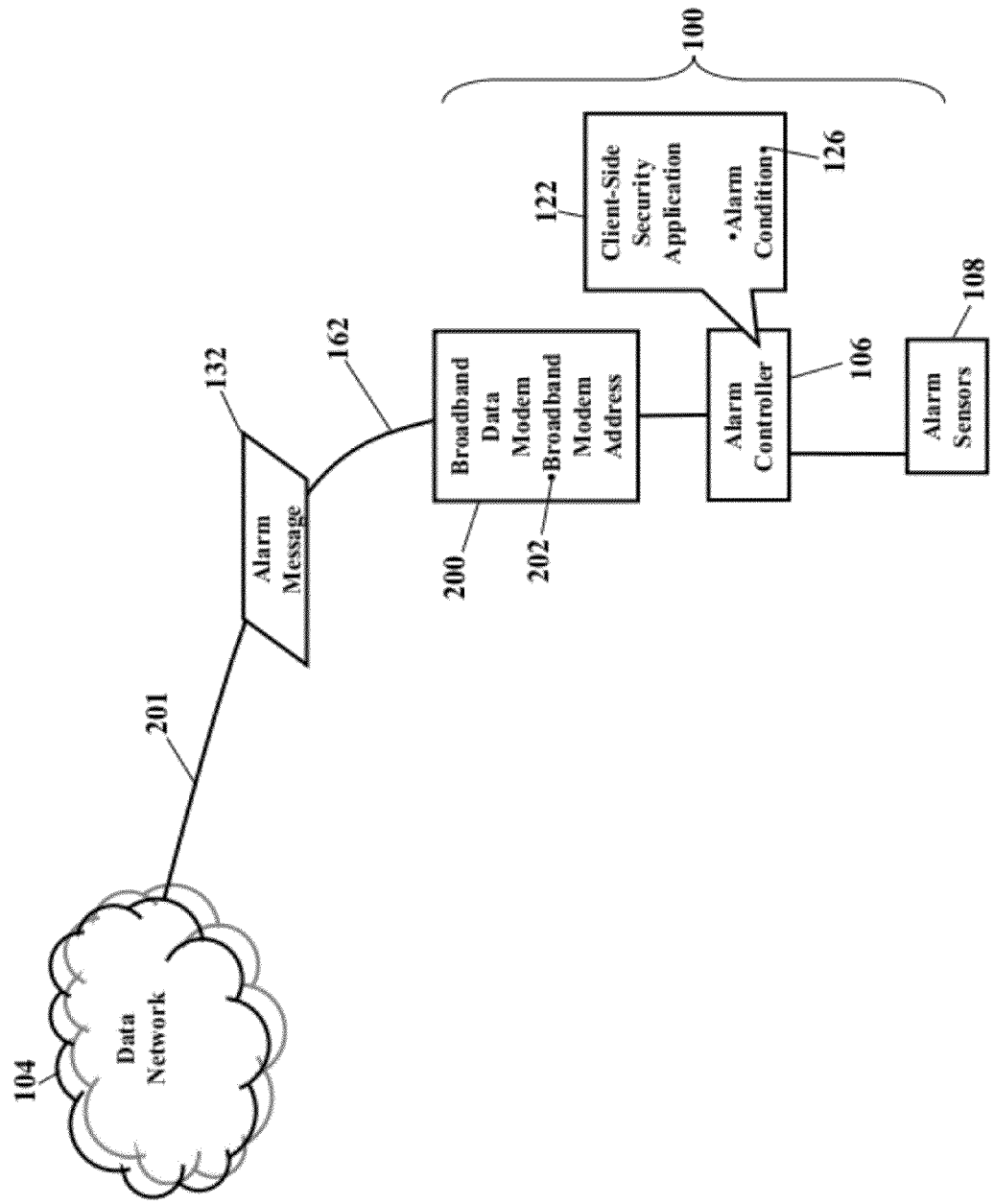

FIG. 5 is a detailed schematic illustrating the wireline broadband network connection 162, according to exemplary embodiments. The alarm controller 106 communicates with a broadband data modem 200. The broadband data modem 200 communicates with the data network 104 over a physical wireline connection 201. The broadband data modem 200 modulates and/or demodulates data that is sent to, and received from, the data network 104. The broadband data modem 200 is well known to those of ordinary skill in the art, so the architecture and operating principles of the broadband data modem 200 need not be discussed. The broadband data modem 200 may be addressable, so the broadband data modem 200 may have a unique or shared broadband modem address 202. When the alarm condition 126 is detected, and when the wireline broadband network connection 162 is available, the client-side security application 122 may route the alarm message 132 over the wireline broadband network connection 162 to the data network 104.

Figure 6:
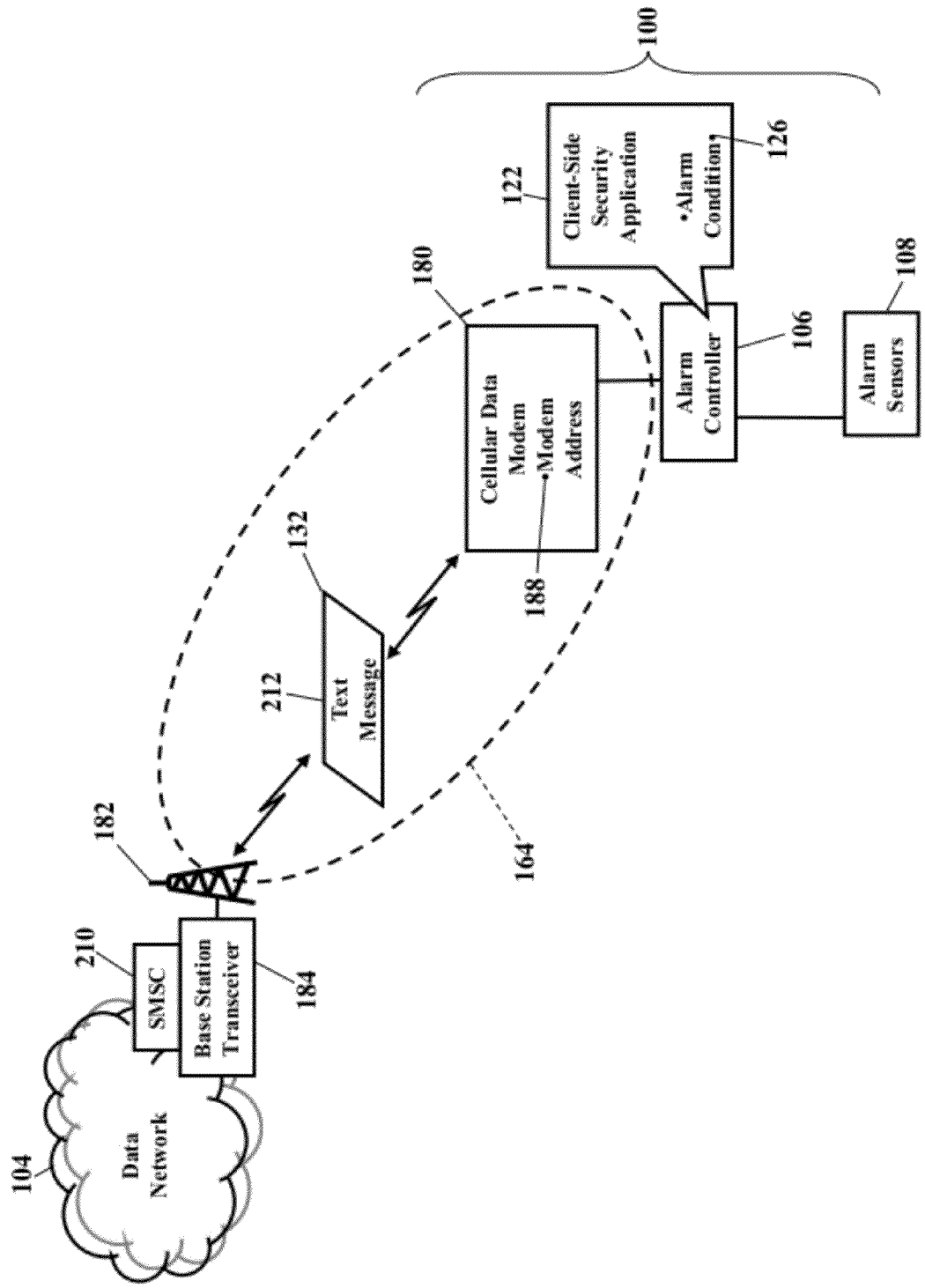

FIG. 6 is a detailed schematic illustrating the short message service 164, according to exemplary embodiments. Here the alarm controller 106 wirelessly communicates with the antenna 182 and the base station transceiver 184 of a short message service center ("SMSS") 210. The short message service center 210 has a data link to the data network 104. The short message service center 210 also has a unique or shared network address. The short message service 164 is well known to those of ordinary skill in the art, so the short message service 164 need not be discussed in detail. The alarm controller 106 sends the alarm message 132 as a text message 212 to the short message service center 210, and the text message 212 routes through the data network 104 to the central monitoring station 102.

Figure 7:
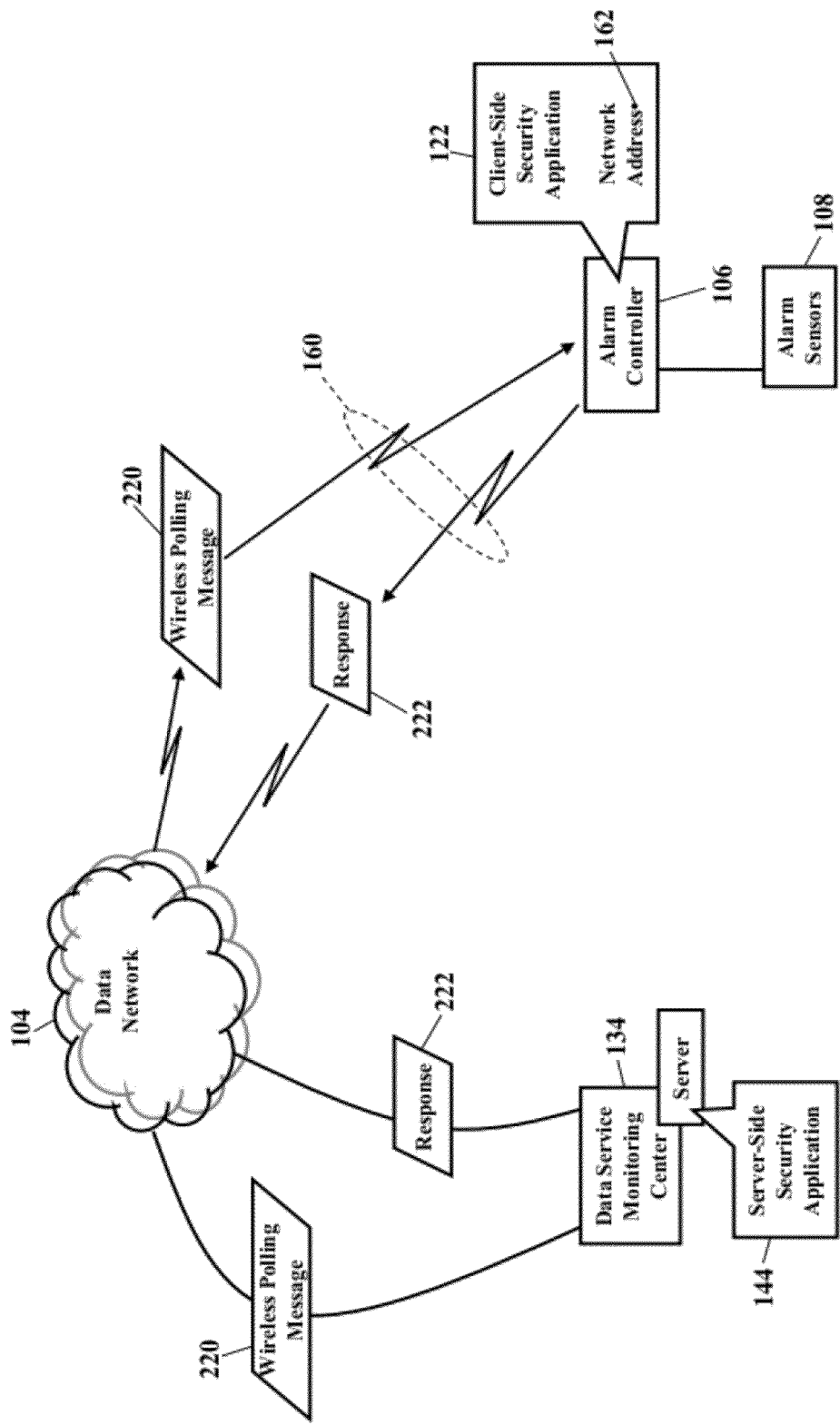
FIGS. 7-11 illustrate polling schemes, according to exemplary embodiments.
Figure 8:
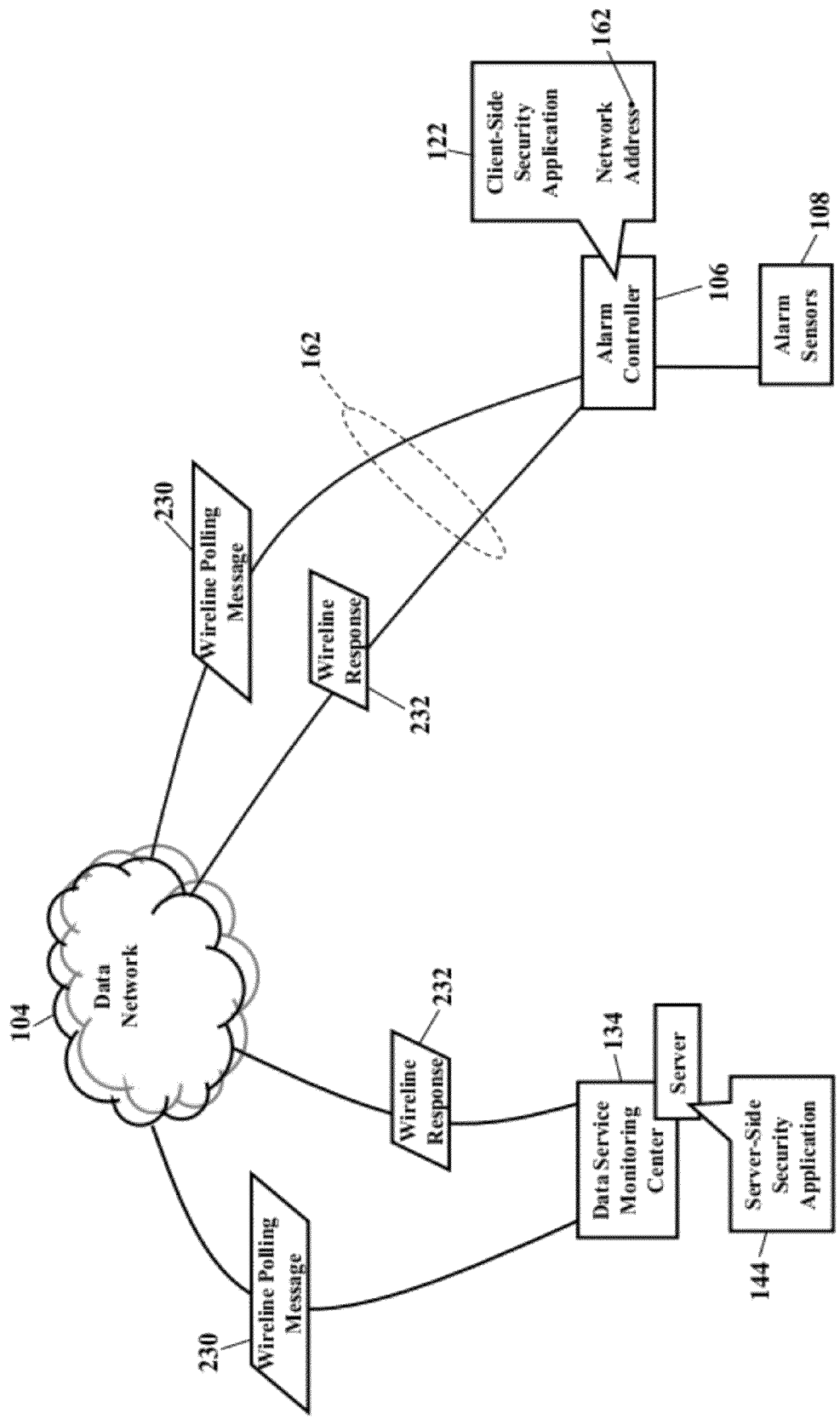
Figure 9:
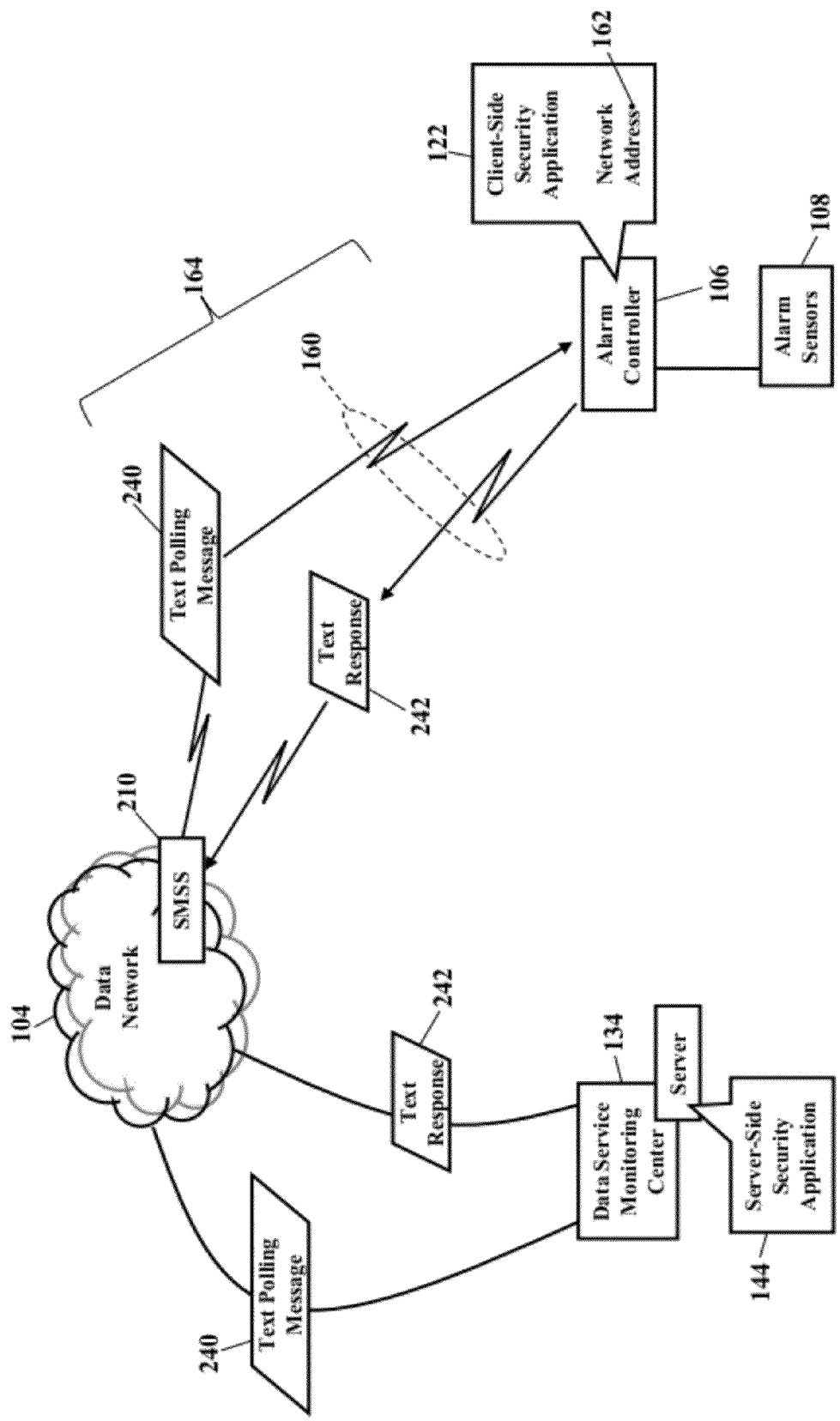

FIGS. 7-9 illustrate polling schemes, according to exemplary embodiments. Here the data service monitoring center 134 may periodically send polling messages to determine the status of the wireless cellular network connection 160, the wireline broadband network connection 162, and/or the short message service 164. If the alarm controller 106 responds, then connectivity is successful. Exemplary embodiments may thus poll for the availability of each network connection.

FIG. 7, for example, illustrates a wireless polling message 220. The wireless polling message 220 may be initiated by a server operating in the data service monitoring center 134. The server operating in the data service monitoring center 134 may execute the server-side security application 144 to route the wireless polling message 220 through the packet data network 104 and over the wireless cellular network connection 160 (e.g., a secure socket layer connection) to the network address 162 associated with the alarm controller 106. When the alarm controller 106 receives the wireless polling message 220, the client-side security application 122 causes the alarm controller 106 to send a response 222. The response 222 may communicate over the wireless cellular network connection 160 to the data service monitoring center 134. When the response 222 is received, the data service monitoring center 134 knows that the wireless cellular network connection 160 is online and communicating.

FIG. 8 illustrates a wireline polling message 230. The wireline polling message 230 routes from the data service monitoring center 134, into and through the packet data network 104, and over the wireline broadband network connection 162 to the alarm controller 106. When the alarm controller 106 receives the wireline polling message 230, the client-side security application 122 causes the alarm controller 106 to send a wireline response 232. The wireline response 232 communicates over the wireline broadband network connection 162 and through the packet data network 104 to the data service monitoring center 134. When the response 222 is received, the data service monitoring center 134 knows that the wireline broadband network connection 162 is online and communicating.

FIG. 9 illustrates a text polling message 240. The text polling message 240 routes from the data service monitoring center 134, into and through the packet data network 104, and to the short message service center ("SMSS") 210. The short message service center 210 then wirelessly routes the text polling message 240 to the network IP address associated with the alarm controller 106. When the alarm controller 106 wirelessly receives the text polling message 240, the client-side security application 122 causes the alarm controller 106 to send a text response 242. Here the text response 242 may wirelessly communicate to the short message service center 210, and the short message service center 210 routes the text response 242 through the packet data network 104 to the data service monitoring center 134. When the text response 242 is received, the data service monitoring center 134 knows that the short message service 164 is online and communicating.

Figure 10:
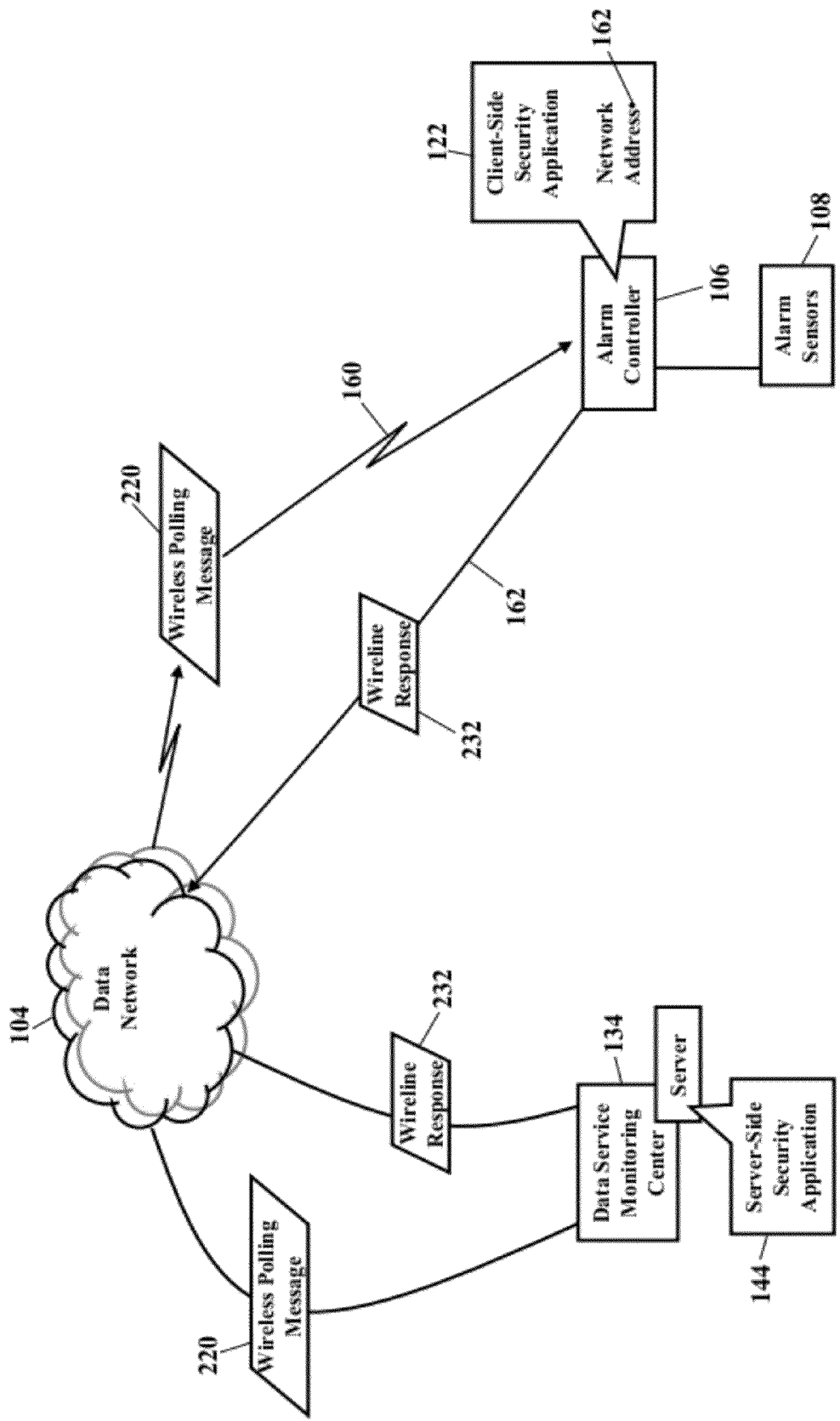

FIG. 10 is another schematic illustrating a polling scheme, according to exemplary embodiments. Here the data service monitoring center 134 utilizes a hybrid polling scheme that tests two connection mechanisms with a single polling cycle. The data service monitoring center 134 sends the wireless polling message 220 over the wireless cellular network connection 160. The wireless polling message 220 routes to the network address associated with the alarm controller 106. When the alarm controller 106 receives the wireless polling message 220, here the client-side security application 122 sends the wireline response 232. The wireless polling message 220 may include header or payload instructions to route the wireline response 232 over the wireline broadband network connection 162 to the data service monitoring center 134. That is, the wireless polling message 220 may include a network path and/or routing information that forces the wireline response 232 to communicate over the wireline broadband network connection 162. When the wireline response 232 is received, the server-side security application 144 knows that the both the wireless cellular network connection 160 and the wireline broadband network connection 162 are online and communicating.

Figure 11:
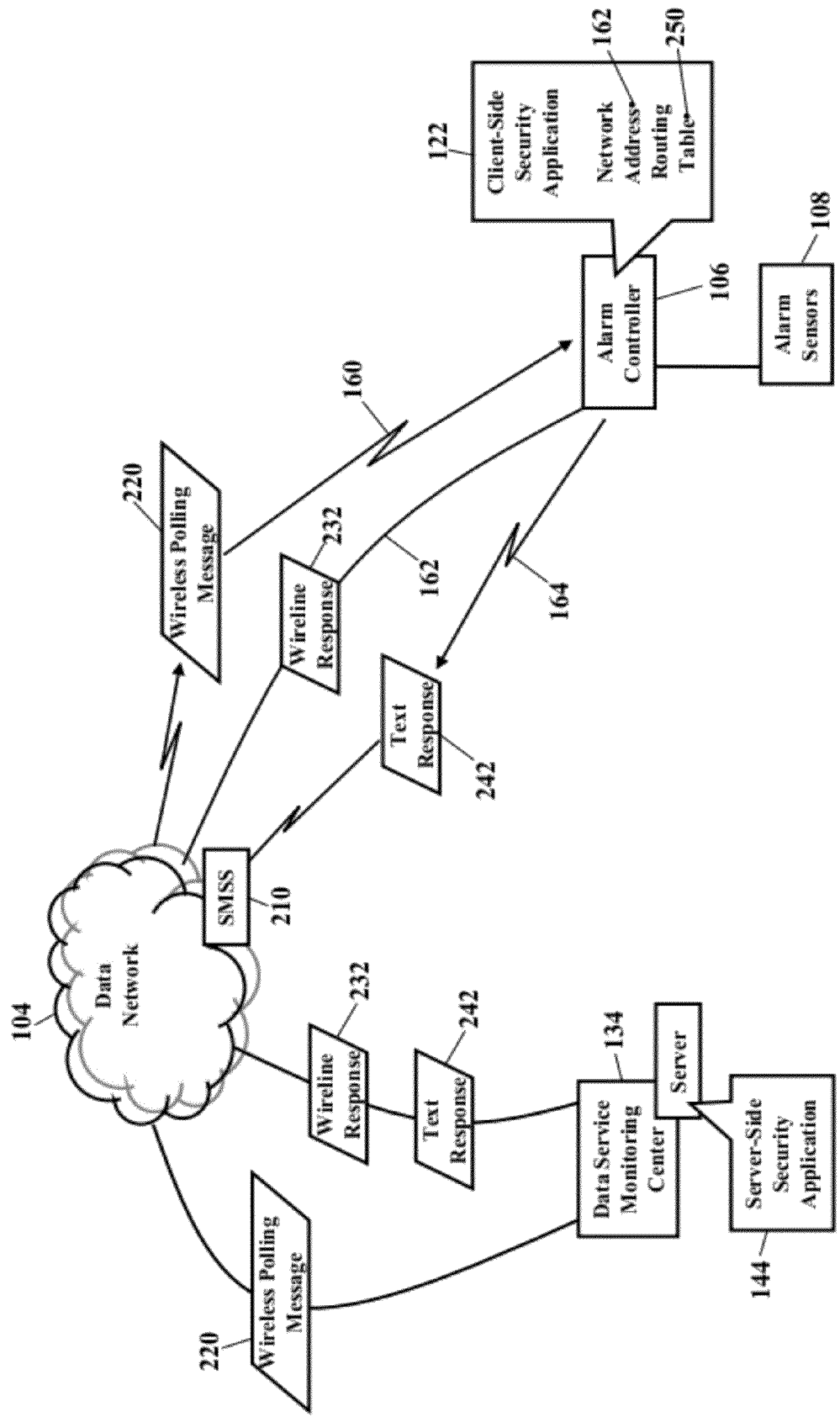

FIG. 11 is a schematic illustrating another polling scheme, according to exemplary embodiments. Here the data service monitoring center 134 utilizes another hybrid polling scheme that tests three connection mechanisms with a single polling cycle. The data service monitoring center 134 again sends the wireless polling message 220 over the wireless cellular network connection 160. When the alarm controller 106 receives the wireless polling message 550, here the client-side security application 122 may send two separate responses. The alarm controller 106, for example, may send the wireline response 232 as a first response. The wireline response 232 communicates over the wireline broadband network connection 162 to the data service monitoring center 134. The alarm controller 106 may also send the text response 242 as a second response. The text response 242 may be sent using the short message service 164 to the data service monitoring center 134. Here, then, the client-side security application 122 may be programmed to send two responses. The client-side security application 122 may obtain routing instructions from the header or payload of the wireless polling message 220.

Exemplary embodiments may additionally or alternatively obtain routing instructions from a routing table 250. The routing table 250 may be locally stored in memory of the alarm controller 106, or portions of the routing table 250 may be remotely stored and accessible over the data network 104. The routing table 250 may specify a network path and/or network addresses that cause the wireline response 232 to route over the wireline broadband network connection 162 to the data service monitoring center 134. That is, the routing table 250 may associate the network address of the alarm controller 106 to a listing of equipment and/or network addresses that force the wireline response 232 to route over the wireline broadband network connection 162. The client-side security application 122 may retrieve pre-specified or configured routing instructions that ensure the wireline response 232 correctly routes over the wireline broadband network connection 162. Likewise, client-side security application 122 retrieves pre-specified or configured routing instructions that ensure the text response 242 routes to the short message service center 210 and then to the data service monitoring center 134. When the wireline response 232 is received, the server-side security application 144 knows that the wireline broadband network connection 162 is online and communicating. When the text response 242 is received, the server-side security application 144 knows that the short message service 164 is online and communicating.

The reliability of the polling schemes illustrated in FIGS. 7-11 depends on fresh information. If the polling scheme is infrequent, then the data service monitoring center 134 may not know the current availability of either connection mechanism. Exemplary embodiments may thus periodically perform any of the polling schemes illustrated in FIGS. 7-11. The data service monitoring center 134, for example, may send the wireless polling message 220 and then wait for receipt of the wireless response 22, the wireline response 232, and/or the text response 242. A timer may be initiated to countdown from a predetermined amount of time before a sequential wireless polling message is sent. The data service monitoring center 134 may initiate a poll at any interval of time, from fractions of seconds to once daily. A polling cycle every minute, as an example, may be adequate for most needs without unnecessarily clogging the data network 104. If both the wireline response 232 and the text response 242 are received, the data service monitoring center 134 may reset the timer. If either response is not received, though, the data service monitoring center 134 may resend polling messages. If, for example, a successive number of pings do not result in either response, then a trouble condition will automatically be reported to the network operations center (illustrated as reference numeral 136 in FIG. 1). Personnel in the network operations center 136 will then identify and isolate the trouble and restore service.

Figure 12:
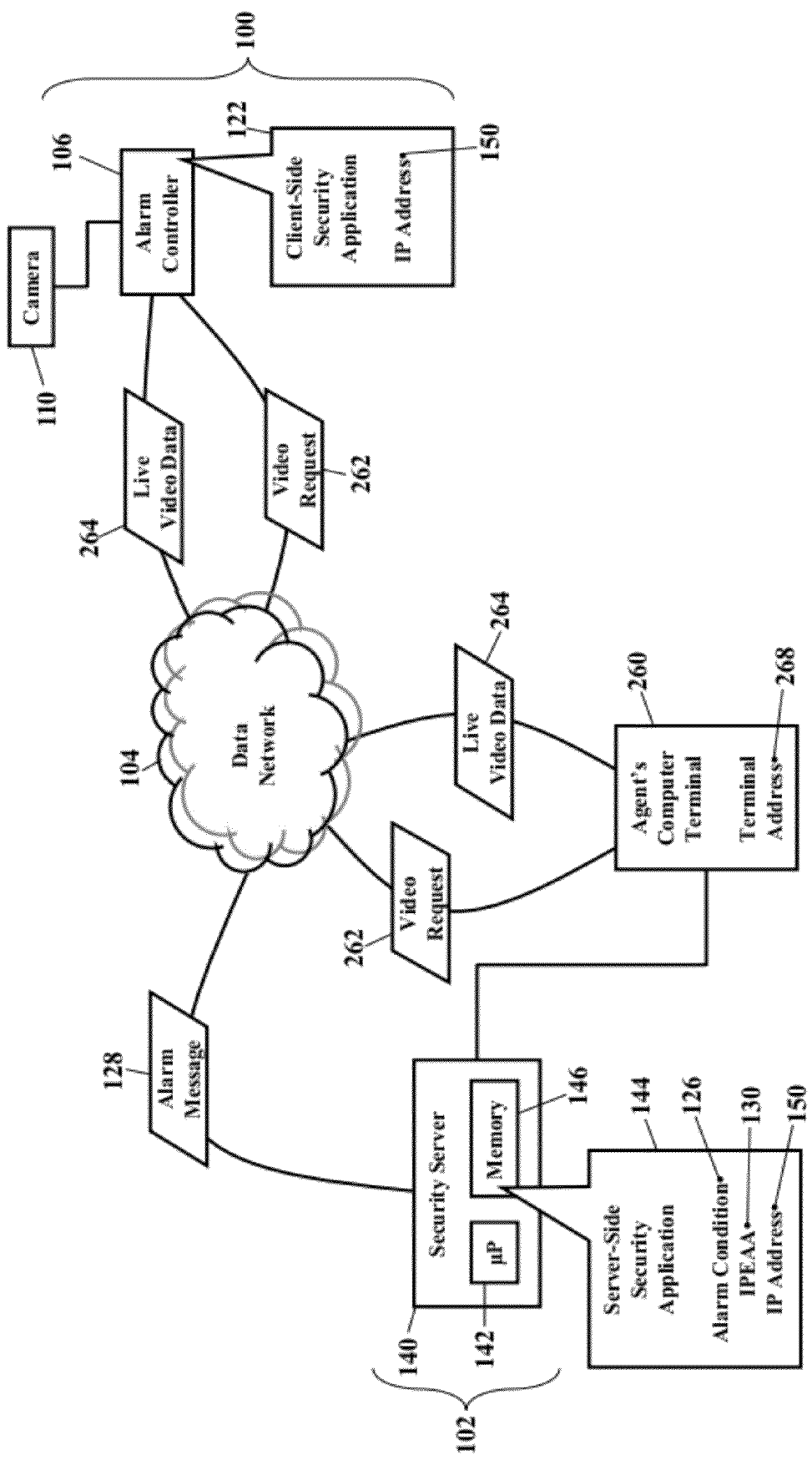
FIG. 12 is a schematic illustrating retrieval of video data, according to exemplary embodiments.

FIG. 12 is a schematic illustrating retrieval of video data, according to exemplary embodiments. When the security server 140 receives the alarm message 132, the agent 151 may want to view live or archived video data of the alarm scene. The agent 151, then, may instruct his or her computer terminal 260 to send a video request 262 to the alarm controller 106. The video request 262 routes over the packet data network 104 to the network IP address 150 associated with the alarm controller 106. When the client-side security application 122 receives the video request 262, the client-side security application 122 retrieves live video data 264 from at least one of the cameras 110. The client-side security application 122 instructs the alarm controller 106 to send the live video data 264 to a terminal IP address 268 associated with the agent's computer terminal 260. The agent's computer terminal 260 has a video processor that displays the live video data 264 on a display device (the video processor and the display device are not shown for simplicity). The agent 151 may view the live video data 264 to help determine whether the alarm condition 126 is legitimate. If the live video data 264 indicates a fire, attack, or other legitimate security concern, then the agent 151 may immediately summon police, fire, and/or other emergency services.

Permissions may need to be established. If multiple cameras are present in the customer's home, the customer may not want the agent to have access to all cameras. That is, there may be some camera outputs that are "off limits" and not accessible. A bedroom security camera, for example, may be configured as "private," not shared, and perhaps not archived. The homeowner/customer may thus establish a policy to manage which camera outputs are available to the central monitoring station during an alarm condition. The client-side security application 122 may be configured to permit, or deny, remote access to any output of any camera 110 according to user and/or the user's location. If a user has acceptable authentication credentials (e.g., username and password), but an unacceptable location (such as GPS coordinates), then the client-side security application 122 may deny access to video and any other feature. Some camera output may be associated with public permissions, while other camera output may be associated with specific authentication credentials.

Figure 13:
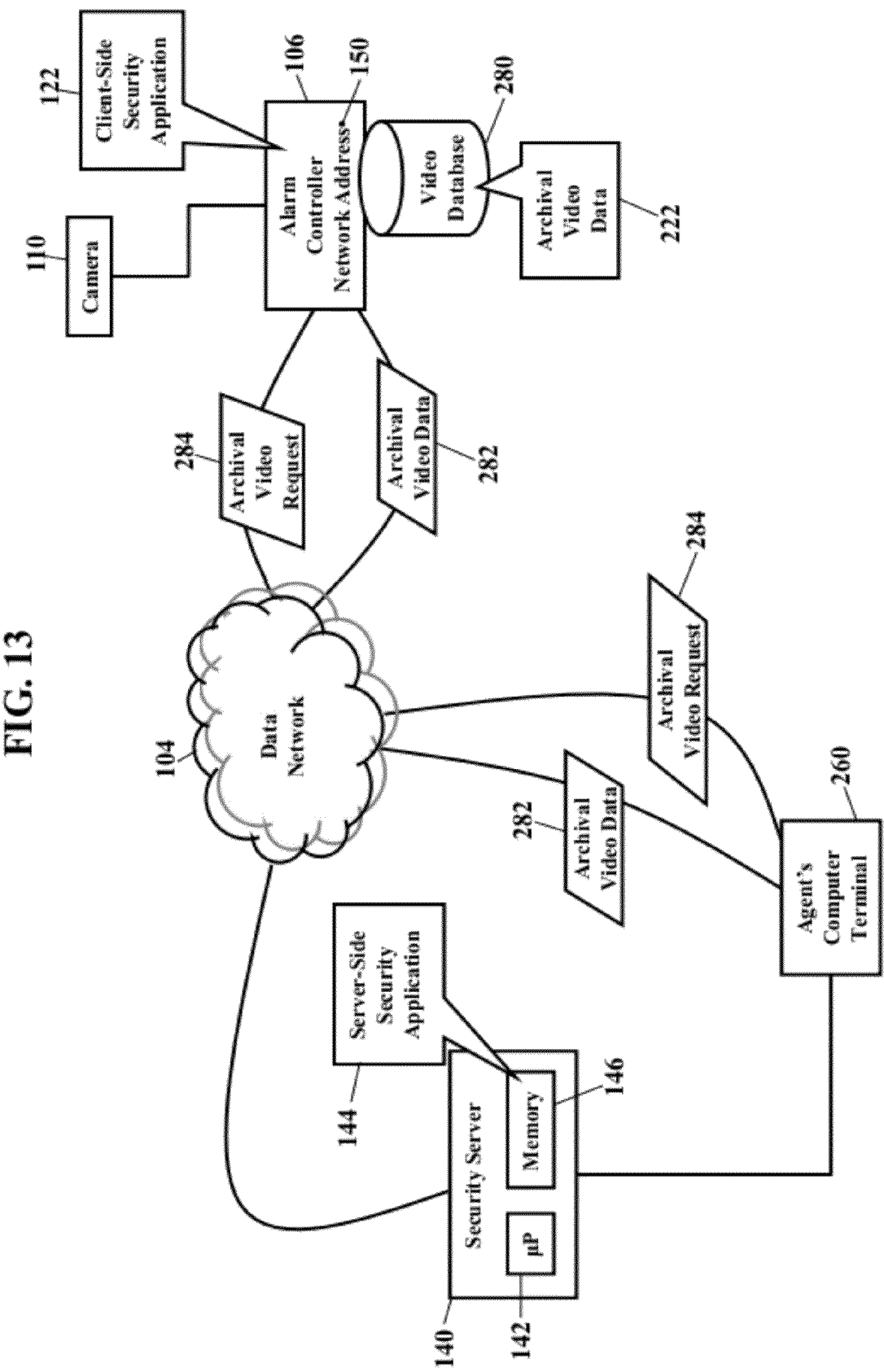
FIG. 13 is a schematic illustrating archival video data, according to exemplary embodiments.

FIG. 13 is a schematic illustrating archival video data, according to exemplary embodiments. Here the agent at the agent's computer terminal 260 may also request and receive older, archived video data. FIG. 13, for example, illustrates a video database 280. As the one or more cameras 110 capture video data, the client-side security application 122 may instruct the alarm controller 106 to store the video data in the video database 280. The video database 280 thus builds up, over time, archival video data 282. The video database 280 may thus be used to reveal important archival video data 282 of events that preceded a fire, burglary, or other emergency situation.

FIG. 13 illustrates a local architecture for the video database 280, according to exemplary embodiments. The video database 280 is locally maintained in a local or home network that is shared with the alarm controller 106. That is, any video data captured by the cameras 110 is stored in a home or business network that communicates with the alarm controller 106. Because the video data is locally captured and stored, the video data need not be sent to a remote storage location via the Internet. Upstream bandwidth consumption is thus reduced or not needed. The video database 280, however, may be remotely located from the alarm controller 106, but excessive bandwidth may be needed to upload video data. Regardless, the video database 280 may store the video data on a FIFO ("first in, first out") basis, with each camera 110 having a dedicated memory space or partition. An alternate storage scheme may used, though, such as a "last in, first out" (or "LIFO") basis to speed recovery of the most recent footage. The video database 280 may also store data as a loop that is overwritten after a predetermined time (such as multiple days or weeks, although a two or three day time period may be adequate for most customers). The video database 280 may also date and time stamp the video data to help indexing and retrieval efforts.

However the video database 280 is configured, the agent's computer terminal 260 may request archival footage. The agent 151 instructs his or her computer terminal 260 to send an archival video request 284 to the alarm controller 106. The archival video request 284 routes over the packet data network 104 to the network IP address 150 associated with the alarm controller 106. When the client-side security application 122 receives the archival video request 284, the client-side security application 122 instructs the video database 280 to retrieve the older archival video data 282 and to send the older archival video data 282 to the terminal address (illustrated as reference numeral 268 in FIG. 12) associated with the agent's computer terminal 260. The agent's computer terminal 260 displays the older archival video data 282, thus allowing the agent 151 to see what events transpired prior to the alarm condition 126. The older archival video data 282 may reveal the cause of a fire, the face of an intruder, or other information that legitimates the alarm condition 126.

Figure 14:
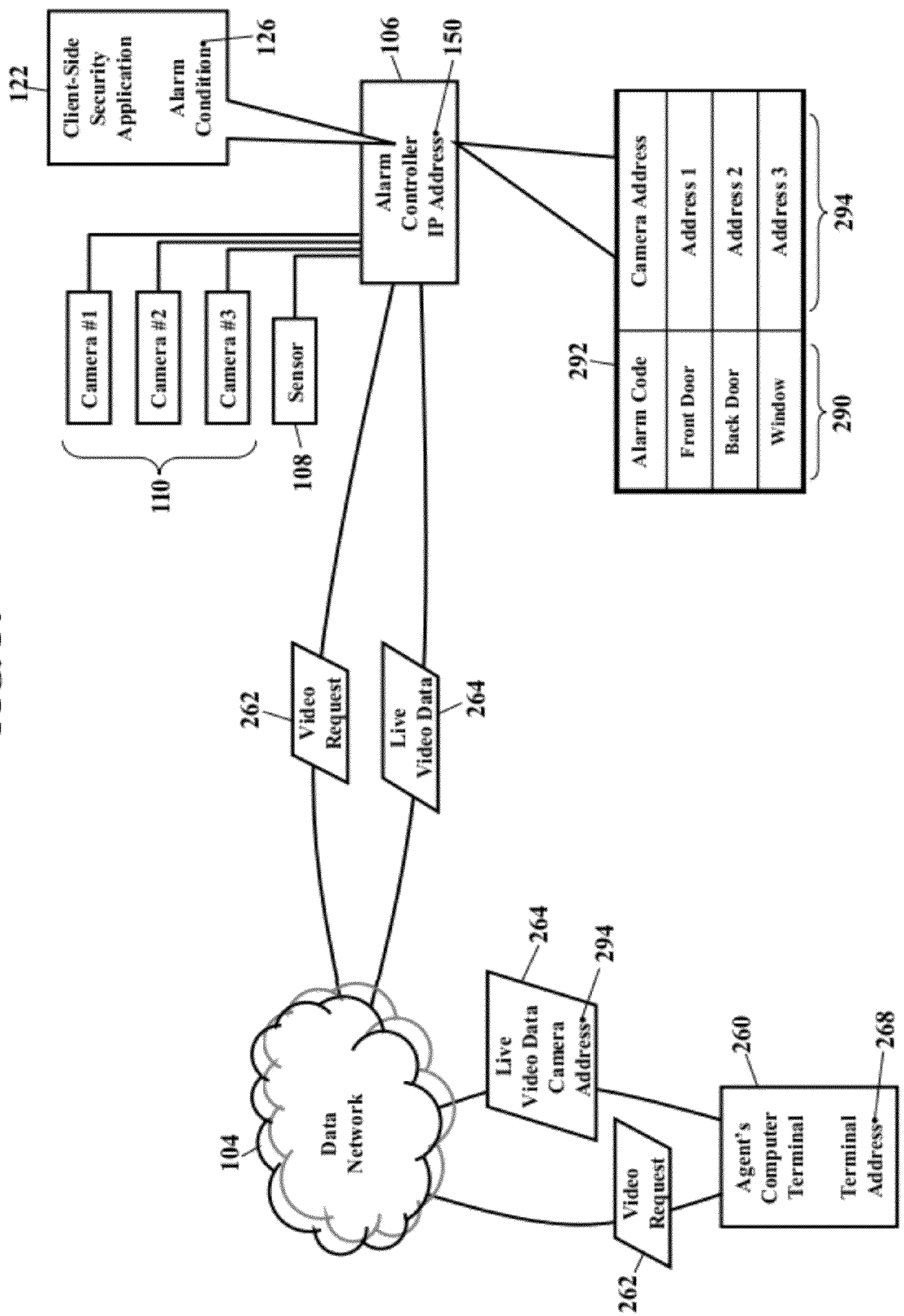
FIG. 14 is a schematic illustrating camera zones, according to exemplary embodiments.

FIG. 14 is a schematic illustrating camera zones, according to exemplary embodiments. Because there may be multiple cameras 110 in a home or business, the live video data 264 may consume too much bandwidth in the packet data network 104. If the client-side security application 122 attempts to send live video data 264 from three (3) different cameras 110, for example, the live video data 264 may likely create or encounter congestion in the packet data network 104. Delivery to the agent's computer terminal 260 may be delayed or even fail. Delay or failure may be unacceptable.

Exemplary embodiments, then, may reduce bandwidth consumption. When the alarm condition 126 is detected, the alarm condition 126 may identify an alarm code 290 associated with the sensor 108 that triggered the alarm condition 126. Suppose the alarm code 290 is associated with a front door sensor. Video data of the front door is thus most relevant. Video data of a back door may be less helpful. Bandwidth may thus be reduced by only sending the live video data 264 from a camera aimed at the front door. Video data of the back door may contribute to congestion and delay delivery of the more-important front door video data.

The client-side security application 122 may then associate the alarm code 290 to a particular one (or more) of the cameras 110. When the client-side security application 122 receives the alarm code 290 associated with the sensor 108 that triggered the alarm condition 126, the client-side security application 122 may select only the most relevant video data. The client-side security application 122, for example, may query a camera table 292 that is stored in the memory of the alarm controller 106. The camera table 292 maps, relates, or otherwise associates the alarm code 290 to a camera address 294. Each of the cameras 110 is uniquely identified with the camera address 294. Each camera 110 may have a private Internet Protocol address, and each camera 110 may interface with a web server (either in the home or in the data network 104). The client-side security application 122 retrieves the camera address 294 that is associated with the alarm code 290. When the client-side security application 122 receives the video request 262, the client-side security application 122 may then retrieve only the live video data 264 associated with the retrieved camera address 294. The client-side security application 122 instructs the alarm controller 106 to send only the live video data 264 associated with the camera address 294 to the agent's computer terminal 260. Because only the relevant video data is sent, less bandwidth is needed.

The agent 151 at the agent's computer terminal 260 may request video from any camera 110. When the alarm message 128 is received, the agent may select a camera 110 to access in the home and start seeing streaming video. The agent's computer terminal 260 may display information indicating the camera zone associated with the alarm condition 126. The agent's computer terminal 260 may also display a graphical user interface that permits the agent 151 to access the live video data 264 from any camera 110 in the home. Under most circumstances the agent 151 will receive and viewing the live video data 264 from one camera 110 at a time. If bandwidth permits, though, the agent 151 could select and view live video data 264 from multiple cameras 110 at one time. Bandwidth concerns, though, are in the access network to the data network 104. The live video data 264 from one or more cameras will not create congestion in the data network 104. If congestion were to occur, congestion will occur in the access network. For example, if a customer has an ADSL service with 1.5 Mbps downstream and 256 Kbps upstream, the upstream bandwidth could be limiting. One may assume that the upstream bandwidth for streaming to a PC is ~140 Kbps.

Any video data, from any camera 110, is also available. Even though the client-side security application 122 may initially send only live video data 264 associated with the camera number 294, the agent 151 may request video data from any camera 110. After the agent 151 views the live video data 264 from the camera number 294 associated with the alarm code 290, the agent 151 may want video data from other cameras. When agent's computer terminal 260 sends a subsequent video request 262, the agent may specify output from a particular camera number 294. The client-side security application 122 retrieves the live video data 264 associated with the requested camera number 294 and sends the requested live video data 264 to the terminal IP address 268 associated with the agent's computer terminal 260.

Zones may also be used. When the alarm condition 126 is detected, the alarm condition 126 may identify the alarm code 290 associated with the sensor 108 that triggered the alarm condition 126. The client-side security application 122 may then query the camera table 292 for the zone and for the associated camera number 294. The client-side security application 122 may then retrieve only the live video data 264 associated with the retrieved camera number 294. Exemplary embodiments may thus enable communication of the specific sensor that triggered the alarm.

Figure 15:
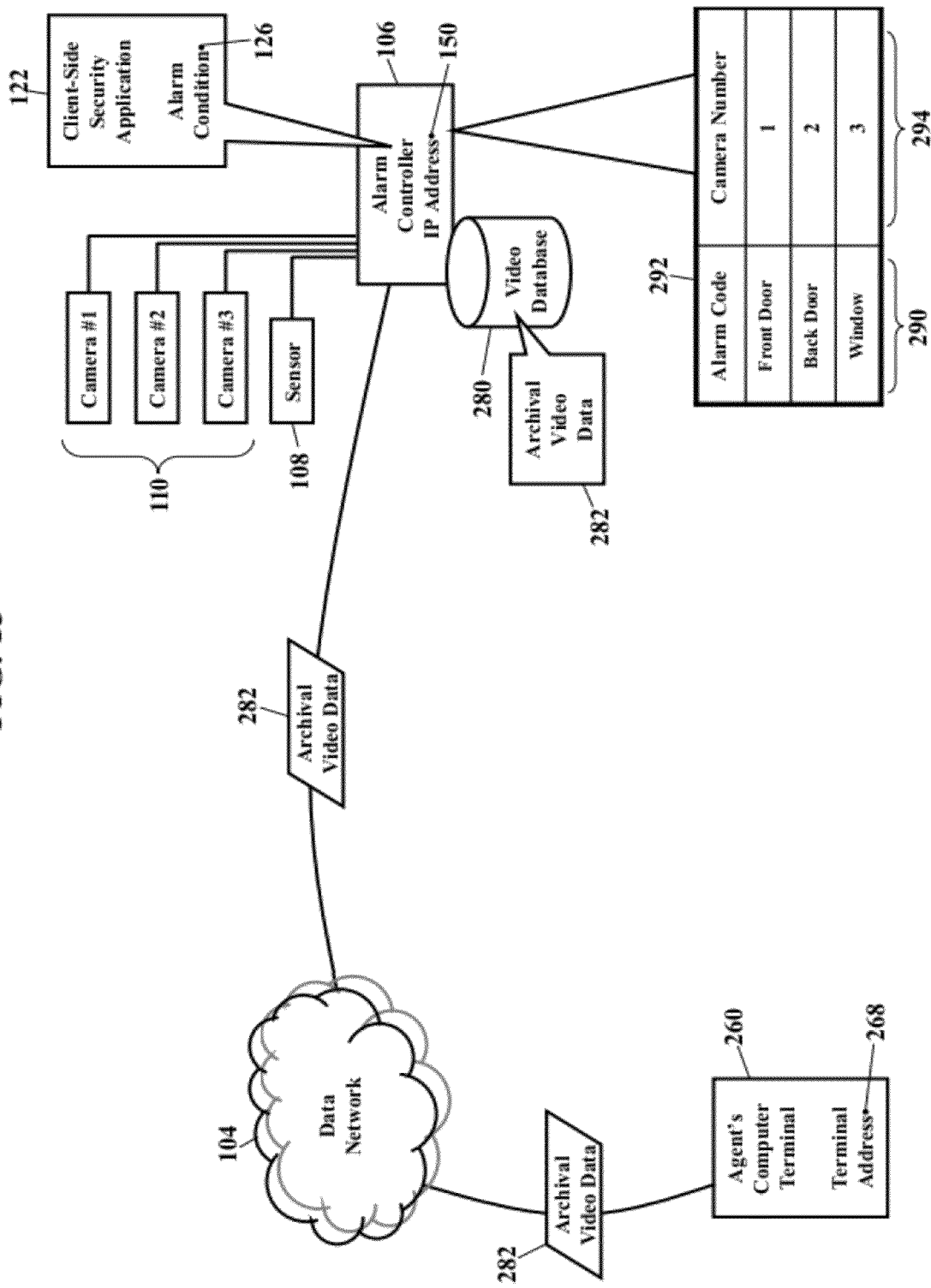
FIG. 15 is a schematic illustrating archival camera zones, according to exemplary embodiments.

FIG. 15 is a schematic illustrating archival camera zones, according to exemplary embodiments. Here the camera table 292 may also be used to retrieve the archival video data 282 associated with a particular camera number 294. Once the alarm code 290 is known, the client-side security application 122 queries the camera table 292 for the camera number 294 associated with the alarm code 290. The client-side security application 122 retrieves the camera number 294 and instructs the video database 280 to retrieve the archival video data 282 associated with the camera number 294. The video database 280 may then send the archival video data 282 to the terminal IP address 268 associated with the agent's computer terminal 260. The agent's computer terminal 260 displays the older archival video data 282, thus allowing the agent 151 to see what events preceded the alarm condition 126.

Figure 16:
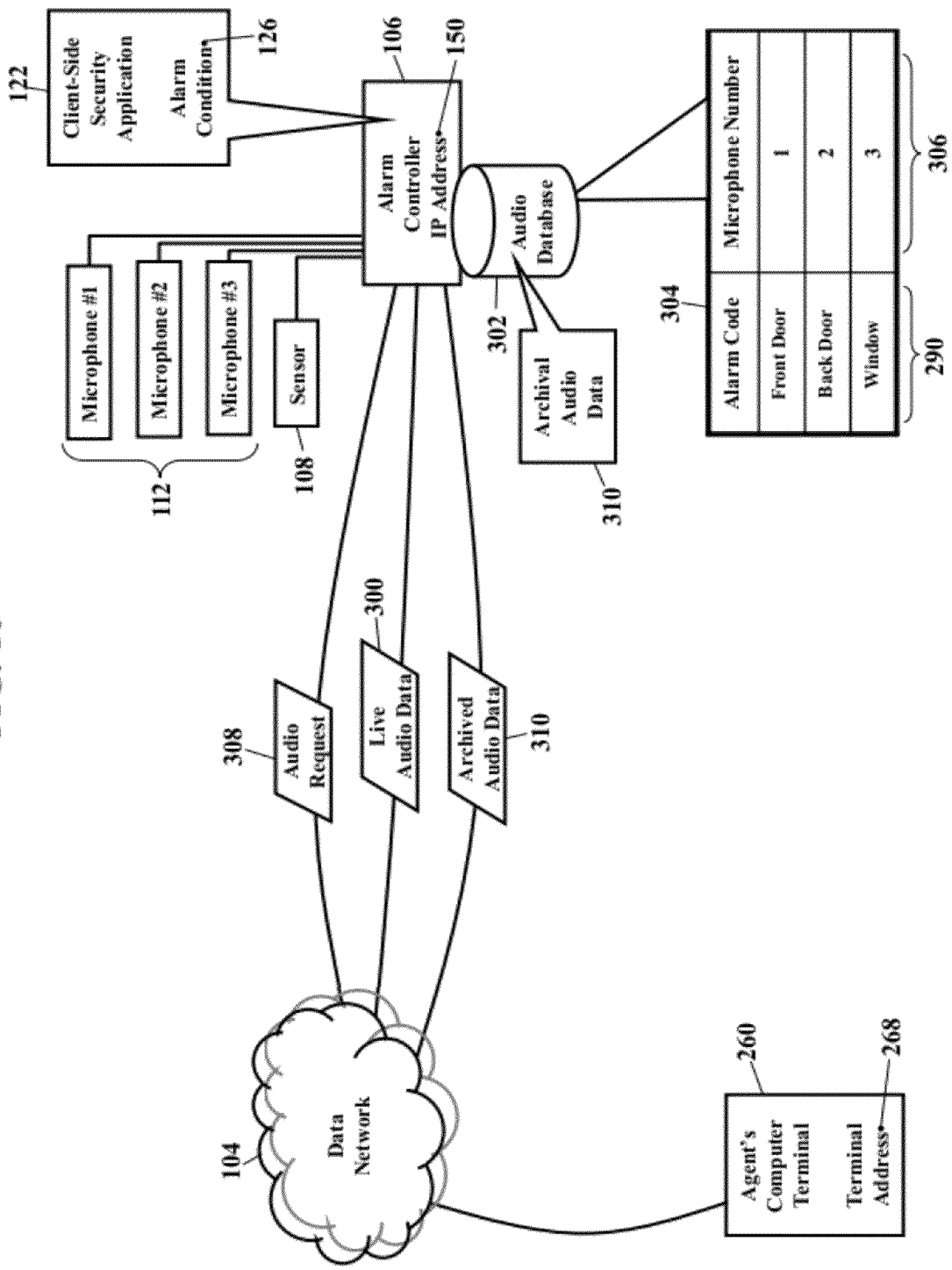
FIG. 16 is a schematic illustrating audio data, according to exemplary embodiments.

FIG. 16 is a schematic illustrating audio data, according to exemplary embodiments. The alarm system 100 may include one or more microphones 112 that capture real-time, live audio data 300. The live audio data 300 may be sent to the agent's computer terminal 260 to help the agent 151 evaluate the emergency situation. The live audio data 300 may also be stored in an audio database 302 to provide a long-term repository of audio data. The audio database 302 is again illustrated as being locally maintained in the customer's local network to reduce bandwidth consumption. The audio database 302 may store the video data on a FIFO ("first in, first out") or LIFO ("last in, last out") basis, with each microphone 112 having a dedicated memory space or partition. The audio database 302 may also store the live audio data 300 as a loop that is overwritten after a predetermined time, and the audio database 302 may also date and time stamp the audio data 300 to help indexing and retrieval efforts. FIG. 16 also illustrates a microphone table 304 modified to also associate the alarm code 290 to a unique microphone number 306. When the client-side security application 122 receives an audio request 308, the client-side security application 122 may then retrieve only the live audio data 300 associated with the microphone number 306. The client-side security application 122 may also instruct the audio database 302 to retrieve archived audio data 310 associated with the microphone number 306. Both the live audio data 300 and the archived audio data 310 may thus be sent to the terminal IP address 268 associated with the agent's computer terminal 260. The live audio data 300 and the archived audio data 310 allows the agent 151 to hear what events preceded the alarm condition 126.

Figure 17:
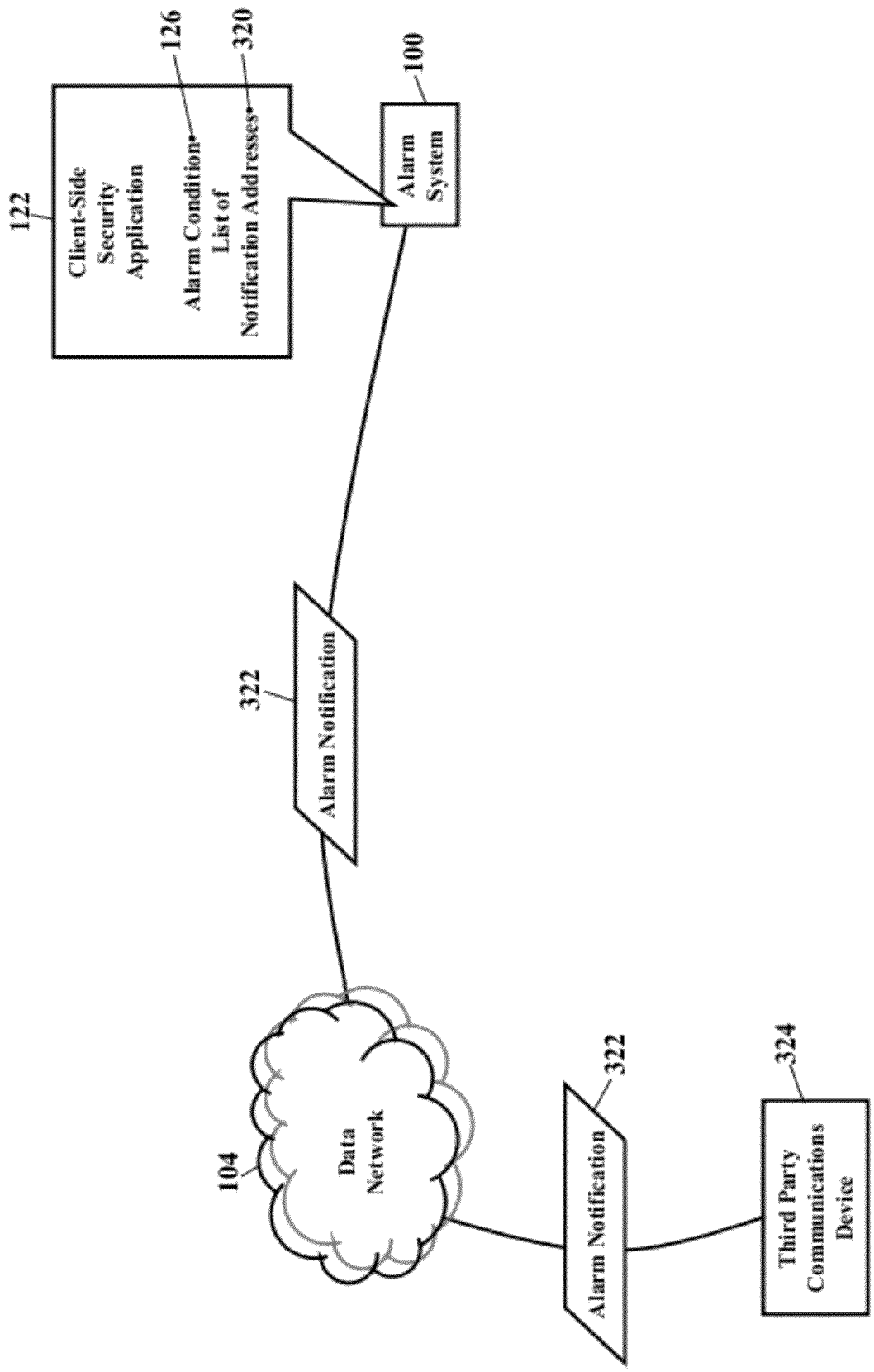
FIGS. 17 and 18 are schematics illustrating remote notification of alarms, according to exemplary embodiments.
Figure 18:
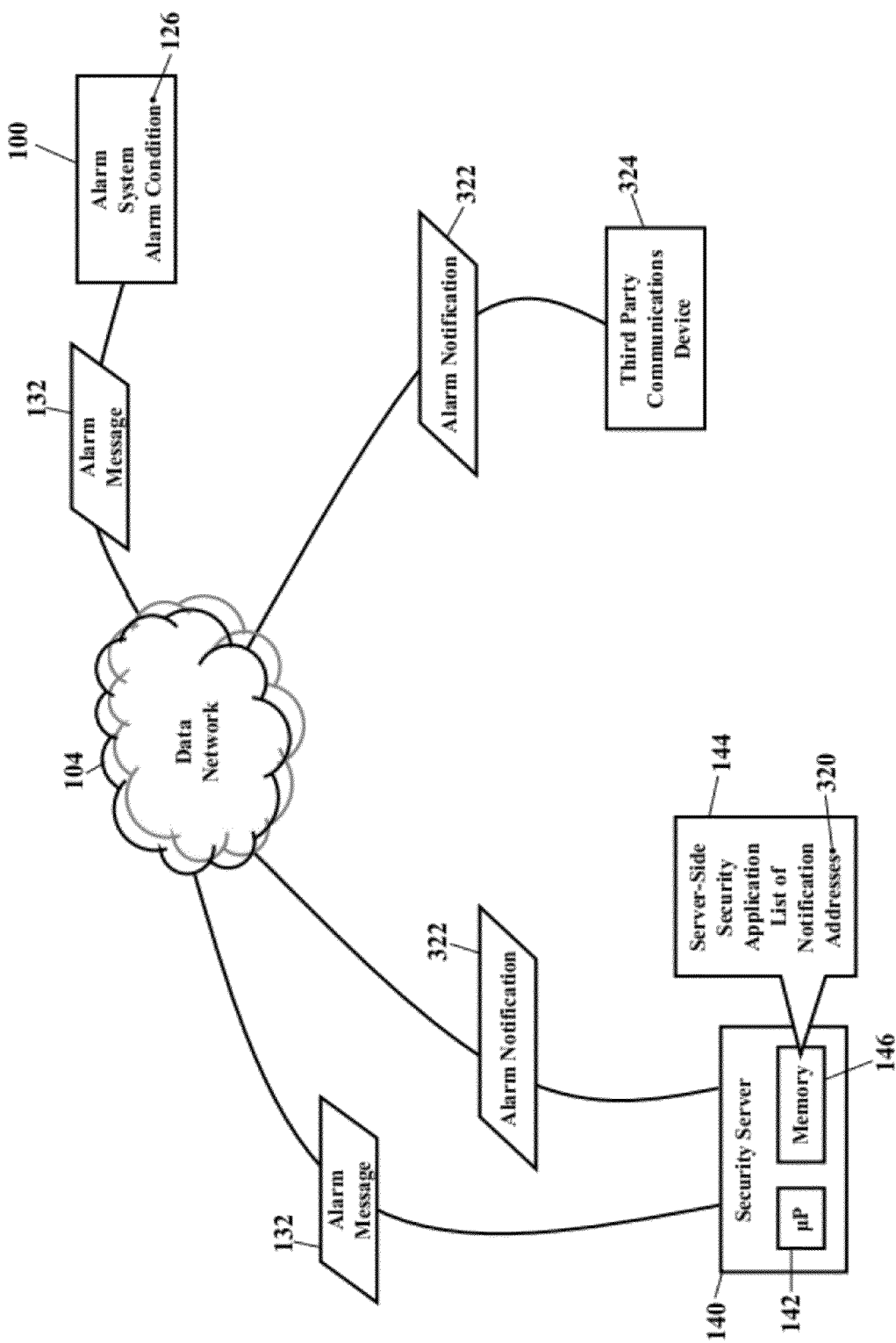

FIGS. 17 and 18 are schematics illustrating remote notification of alarms, according to exemplary embodiments. FIG. 17 illustrates the client-side security application 122 notifying any third party of the alarm condition 126 detected by the security system 100. When the alarm controller 106 detects the alarm condition 126, the client-side security application 122 may access a list 320 of notification addresses. The list 320 of notification addresses is illustrated as being locally stored in the alarm controller 106, but the list 320 of notification addresses may be remotely accessed and retrieved via the packet data network 104. The list 320 of notification addresses stores communications addresses which are notified of the alarm condition 126 detected by the security system 100. Each entry in the list 320 of notification addresses may be a telephone number, I.P. address, email address, pager address, or any other communications address. The client-side security application 122 formats an alarm notification 322, and the alarm notification 322 may include information describing the alarm condition 126 (such as the alarm code 290, a physical street address, and any other information). The client-side security application 122 then sends the alarm notification 322 to each entry in the list 320 of notification addresses. FIG. 17 illustrates the alarm notification 322 communicating via the packet data network 104 to a third party communications device 324 associated with one of the notification addresses. The client-side security application 122 may thus notify friends, neighbors, a spouse, children, and any communications addresses in the list 320 of notification addresses.

FIG. 18 illustrates the server-side security application 144 notifying third parties. When the server-side security application 144 receives the alarm message 132, here the server-side security application 144 accesses the list 320 of notification addresses. The list 320 of notification addresses is illustrated as being locally stored in the security server 140, but the list 320 of notification addresses may be remotely accessed and retrieved via the packet data network 104. The server-side security application 144 formats the alarm notification 322 and sends the alarm notification 322 to each entry in the list 320 of notification addresses. FIG. 18 also illustrates the alarm notification 322 communicating via the packet data network 104 to the third party communications device 324 associated with one of the notification addresses.

Figure 19:
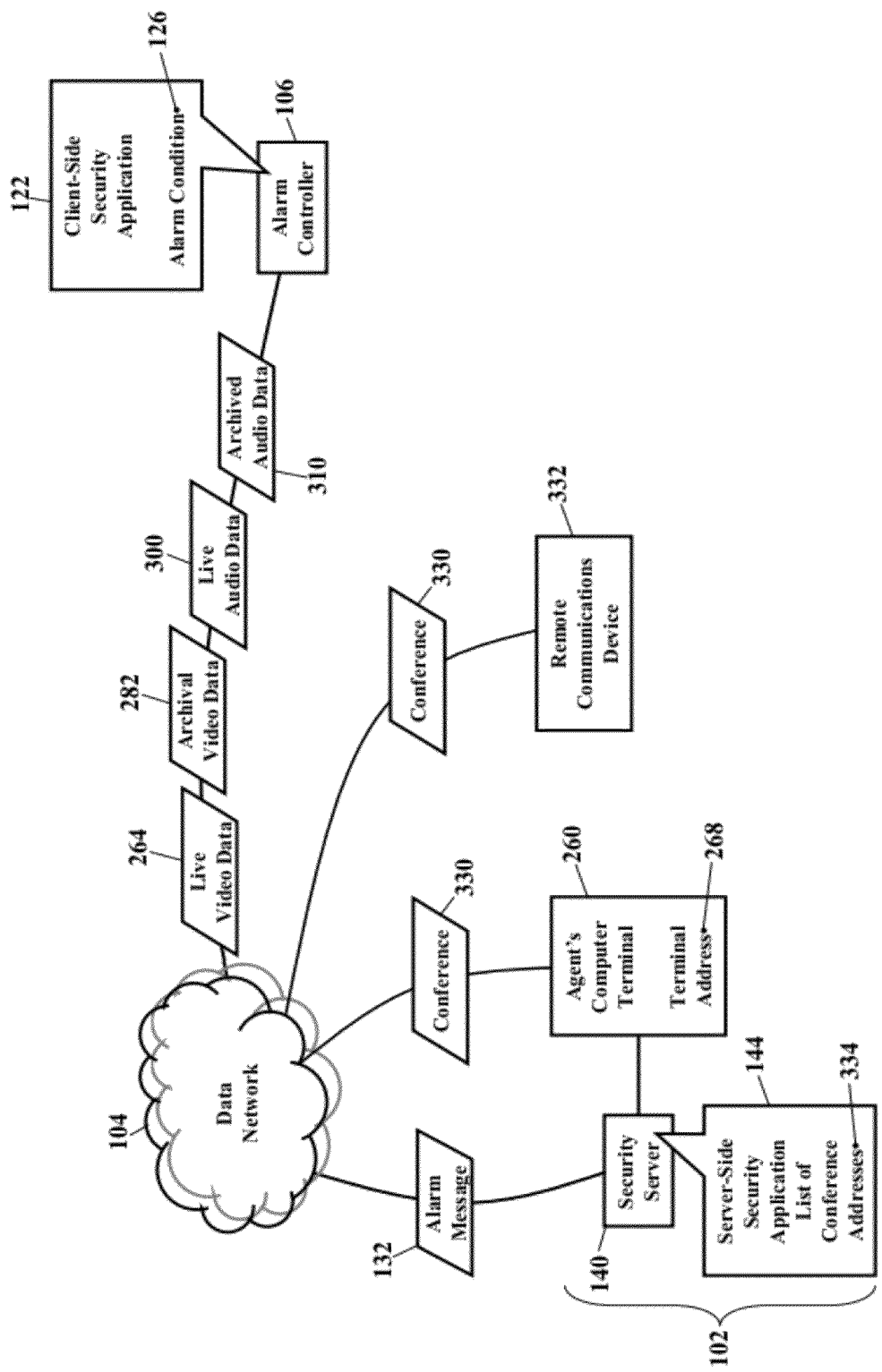
FIGS. 19 and 20 are schematics illustrating alarm conferences, according to exemplary embodiments.

FIG. 19 is a schematic illustrating alarm conferences, according to exemplary embodiments. When the alarm message 132 is received, exemplary embodiments may establish a conference 330 with a remote communications device 332. FIG. 19, for example, illustrates a sessions-based conference that utilizes the packet data network 104. When the alarm message 132 is received at the central monitoring station 102, the server-side security application 144 may access a list 334 of conference addresses. The list 334 of conference addresses is illustrated as being locally stored in the security server 140, but the list 334 of conference addresses may be remotely accessed and retrieved via the packet data network 104. The list 334 of conference addresses stores communications addresses which are joined to a shared communications session (such as a Voice-over Internet Protocol conference call, a video conference, or even a text conference). The server-side security application 144 establishes a common session with one or more of the communications addresses in the list 334 of conference addresses. Once the conference 330 is established, the server-side security application 144 cooperates with the client-side security application 122 to send the live video data 264, the archived video data 282, the live audio data 300, and/or the archived audio data 310 to a conference participant associated with the remote communications device 332. The conference participant is thus able to receive real-time and archived audio and video data of the emergency situation.

Figure 20:
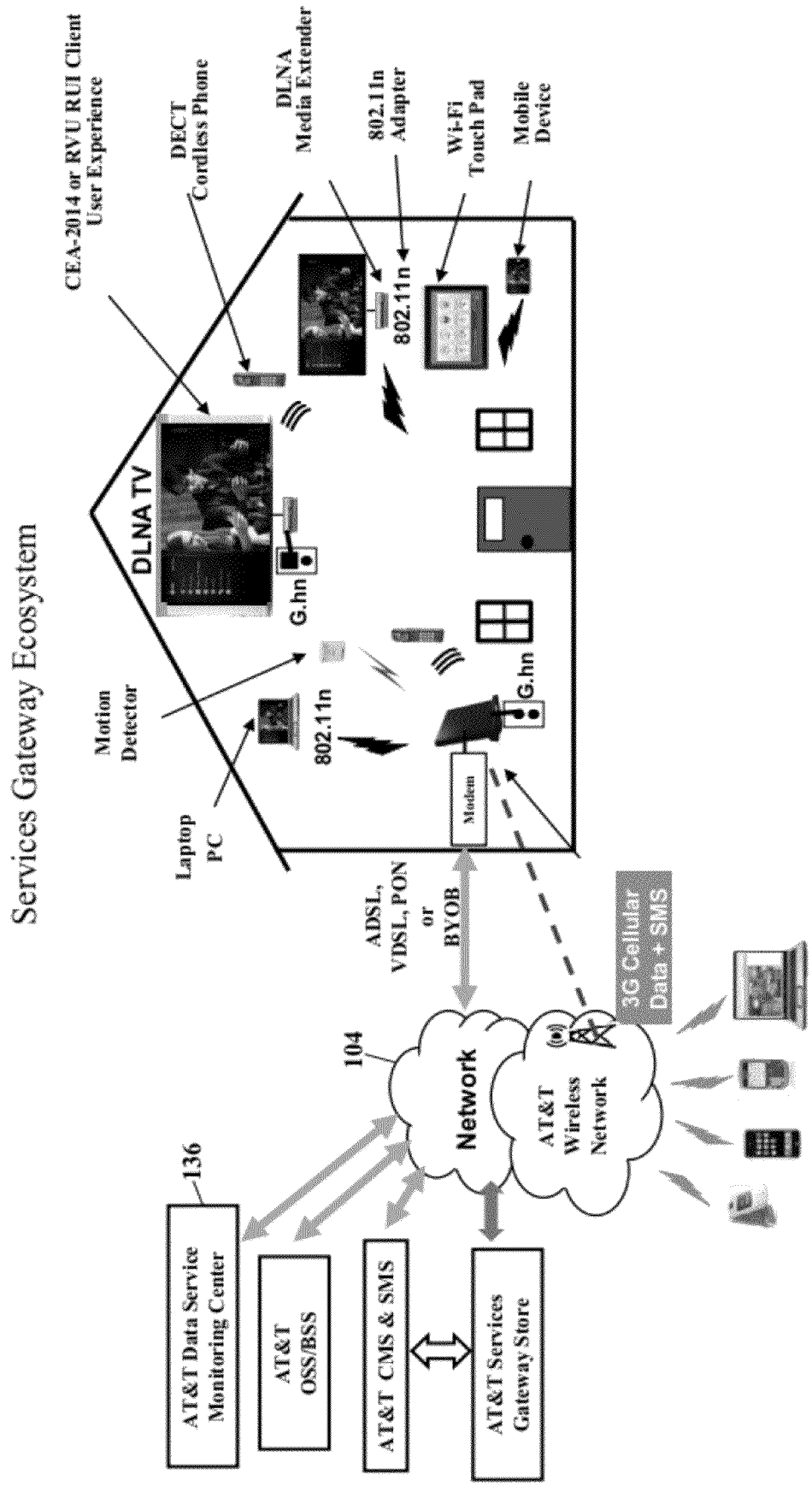

FIG. 20 is a schematic illustrating a services gateway ecosystem, according to exemplary embodiments. FIG. 20 illustrates a residential services gateway ecosystem comprising broadband wireline data service, 3G cellular packet data service, and a data service monitoring platform. Software in the Services Gateway will constantly monitor the availability of the customer's broadband wireline data service, i.e., ADSL, VDSL or Bring-Your-Own-Broadband. When the customer's broadband wireline data service is available, the Services Gateway will always utilize the broadband wireline data service, i.e., DSL or cable modem service, to connect to the network. When the broadband wireline service is not available, then the Services Gateway will automatically switch to the 3G Cellular Packet Data Service (GPRS, EDGE, UMTS or HSPA) to connect to the data network 104 and automatically return to the broadband wireline data service when it is restored.

For the Home Security application, 3G Cellular Data may be the primary signaling path to the central monitoring station 102. If 3G Cellular Data is not available, however, then broadband wireline data will be used. If neither 3G Cellular Packet Data Service nor broadband wireline service are available, then signaling to the central monitoring station 102 will be done using SMS (text messaging). Because control over cellular networks may be maintained and ensured, cellular networks will be default. When a customer does not have a broadband wireline service, virtually all services can be supported using 3G Cellular Packet Data Service (GPRS, EDGE, UMTS or HSPA) to connect to the data network 104. The data service monitoring center 134 in the data network 104 may constantly monitor the status of the broadband wireline data service and the 3G Cellular Packet Data Service to each customer's home. If either service becomes unavailable, then the data service monitoring center 134 may automatically initiate a process to determine why the service has failed and initiate a service restoral process.

Figure 21:
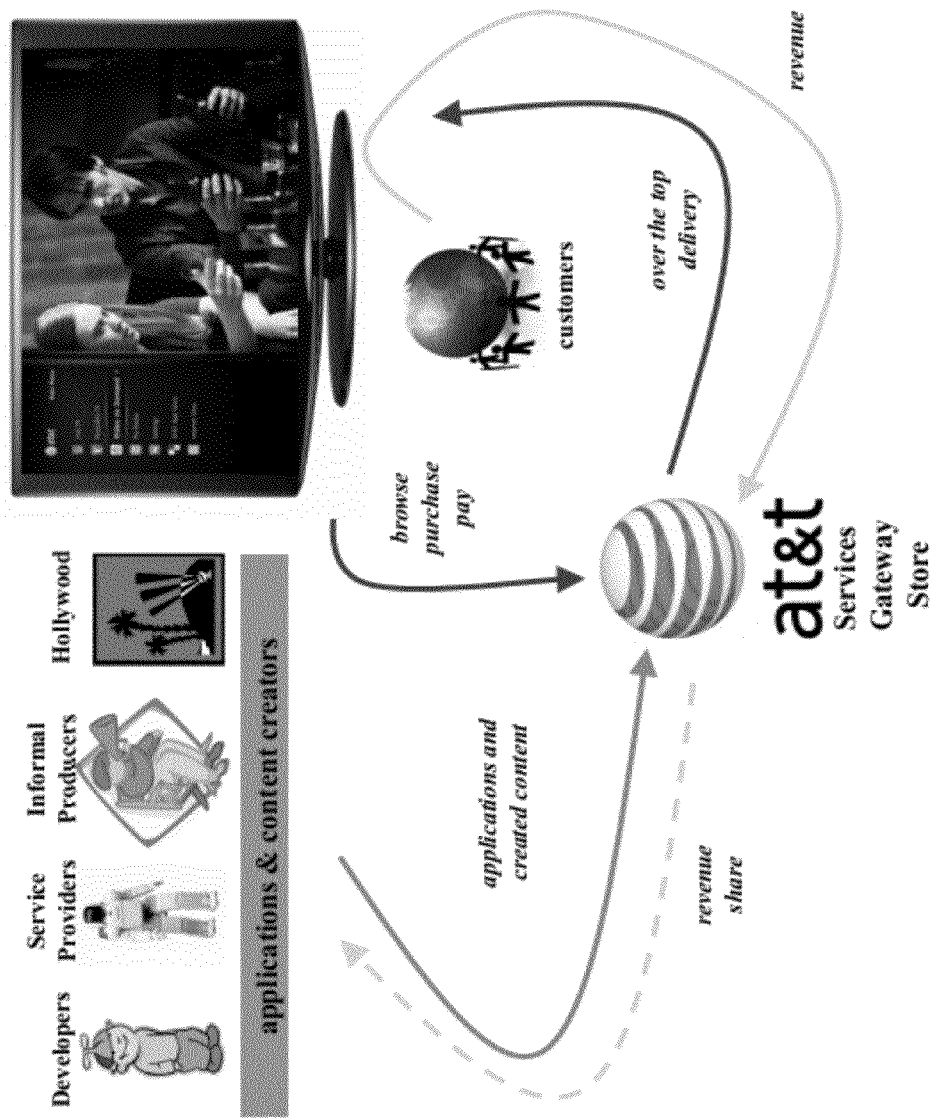
FIG. 21 is a schematic illustrating a services gateway ecosystem, according to exemplary embodiments.
Figure 22:
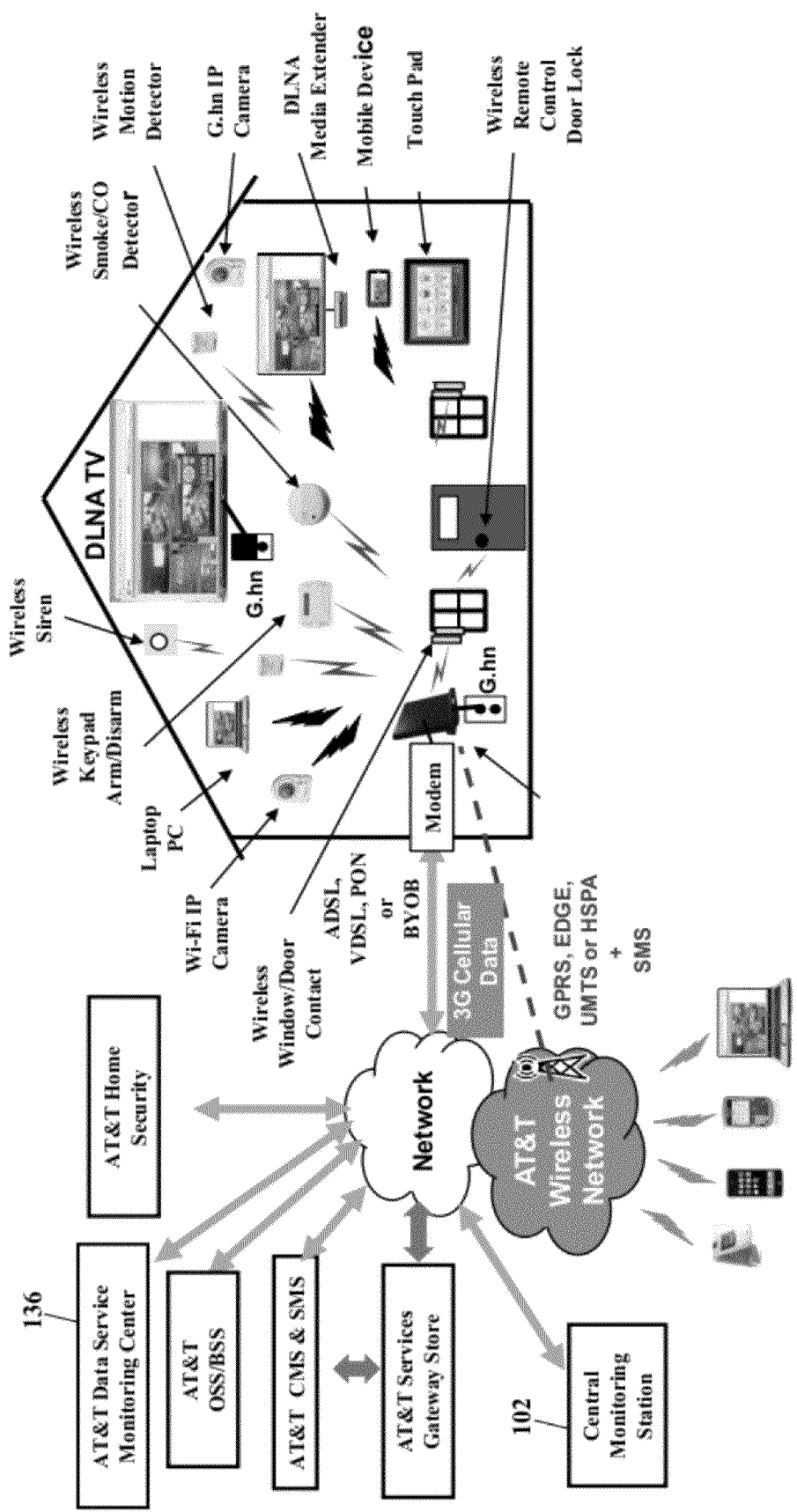
FIG. 22 is a schematic illustrating a services gateway store, according to exemplary embodiments.
Figure 23:
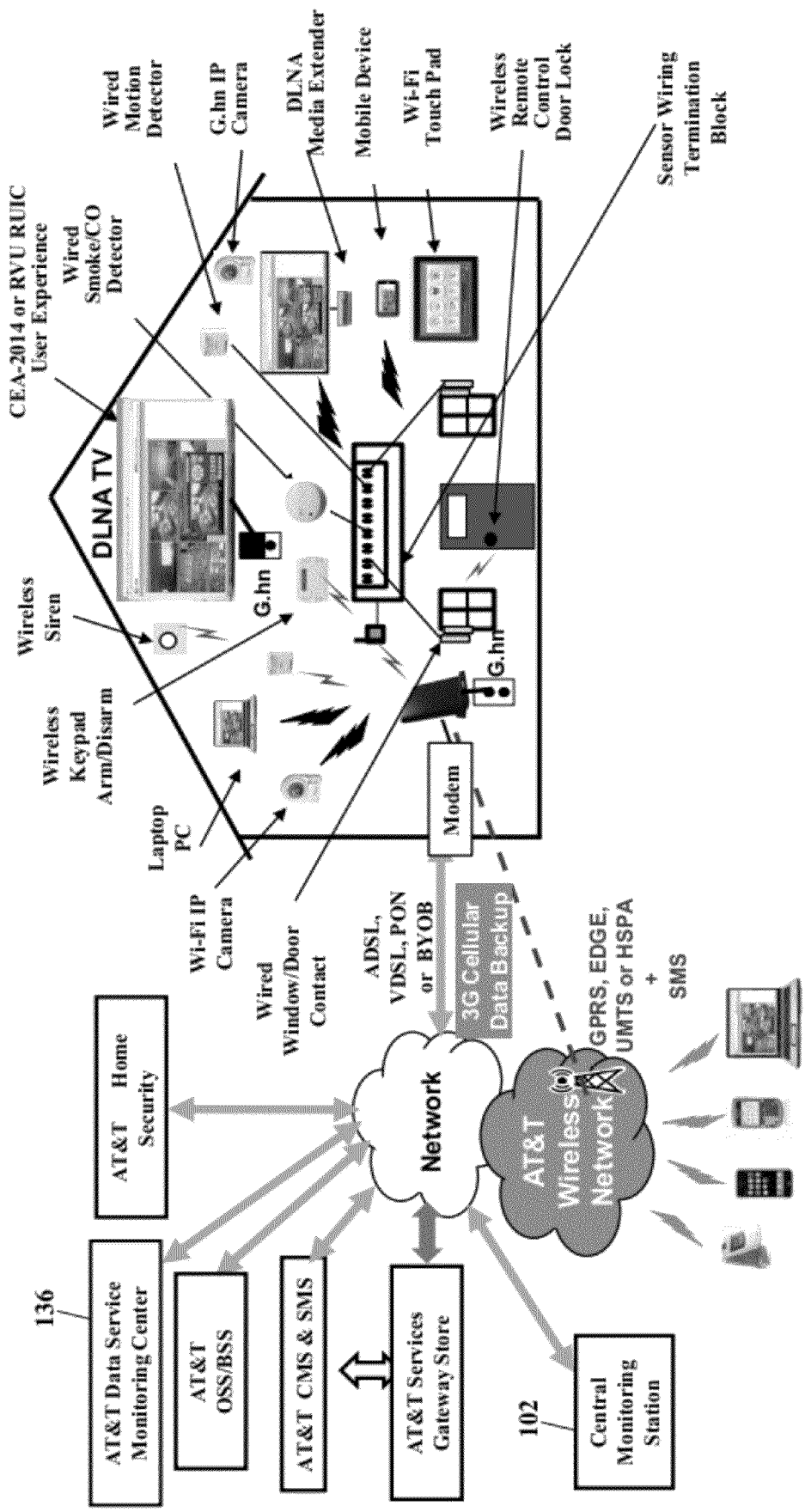
FIGS. 23-26 are schematics illustrating various architectures for a professionally monitored Home Security System, according to exemplary embodiments.
Figure 24:
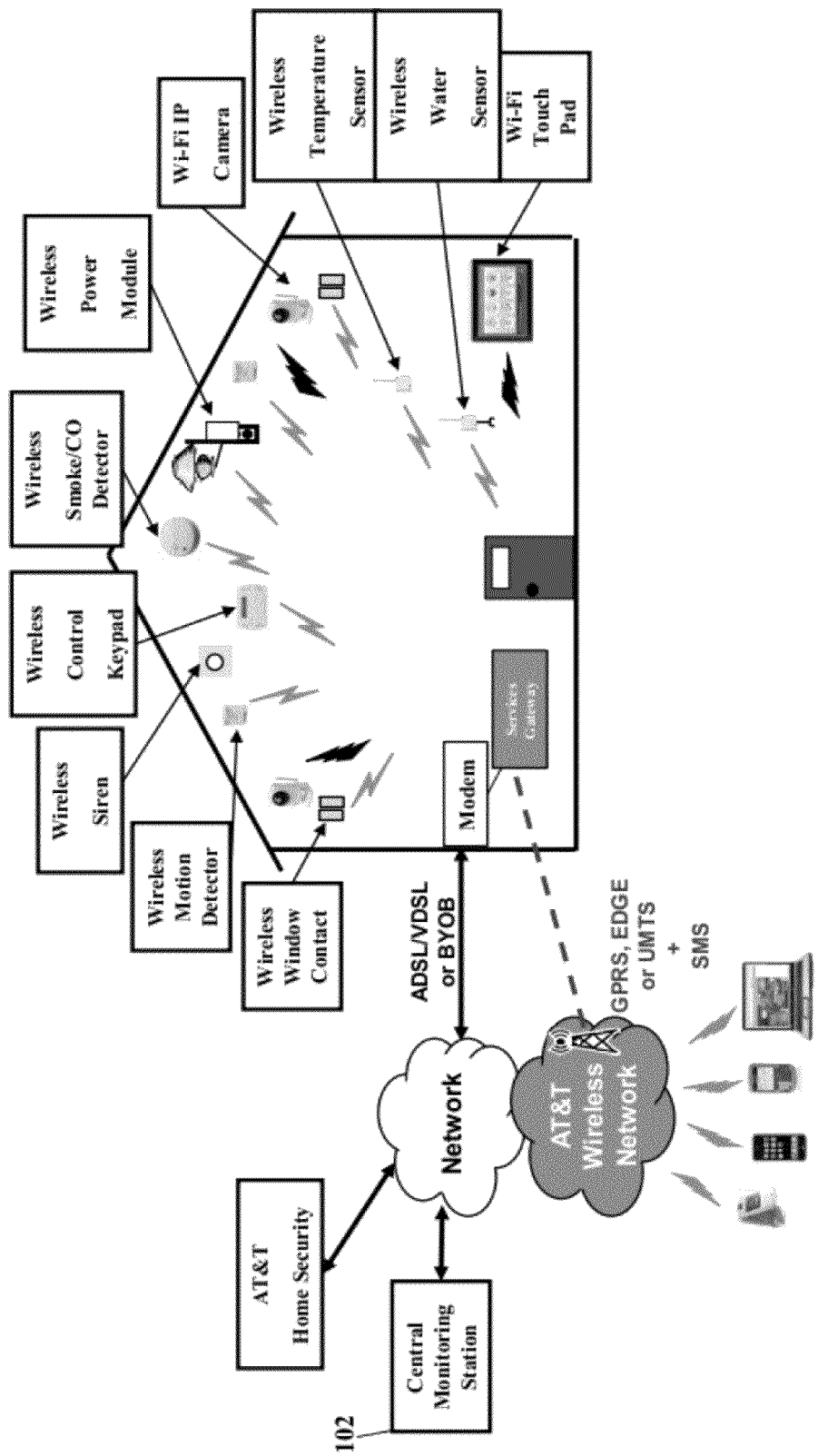
Figure 25:
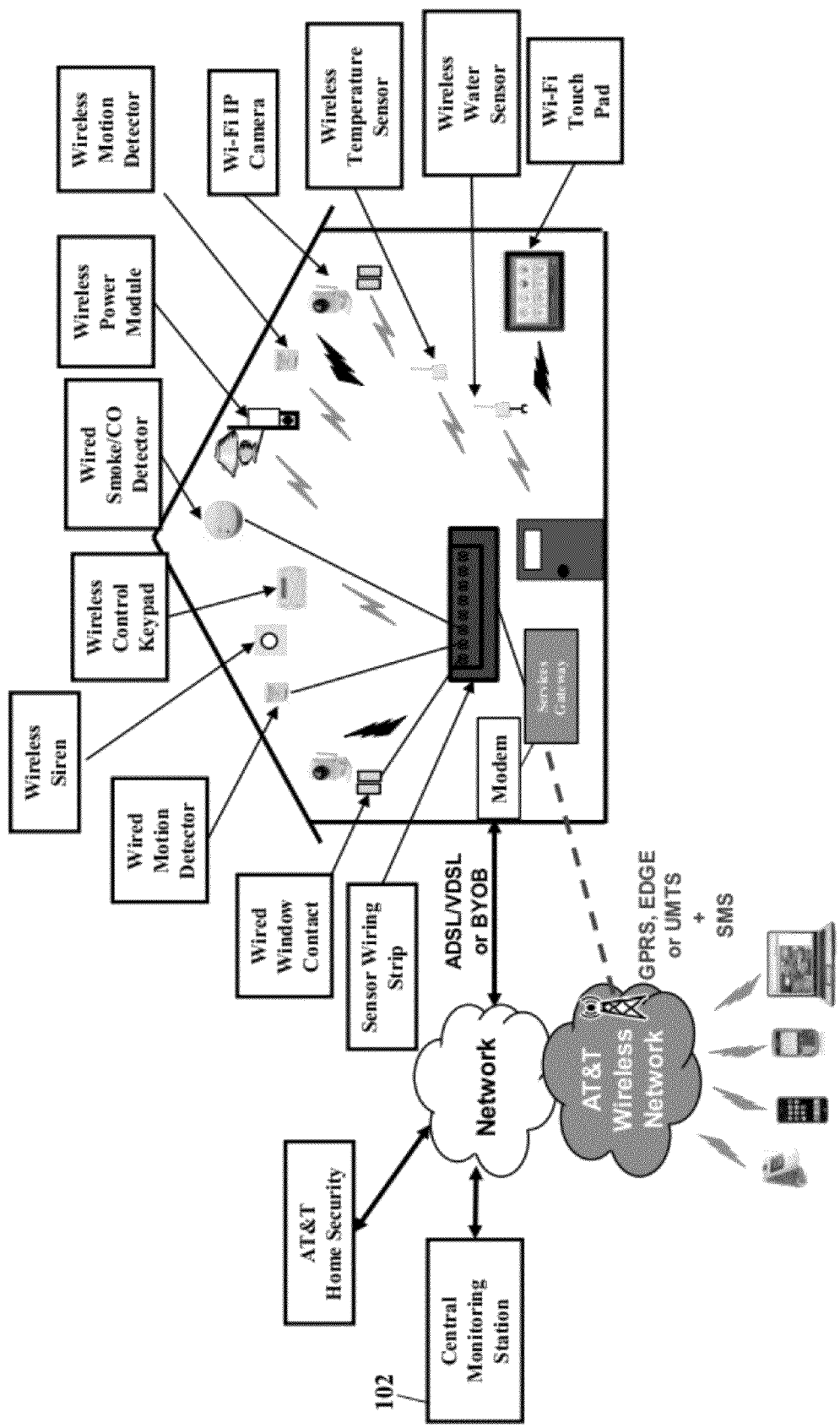

FIG. 21 is a schematic illustrating a services gateway store, according to exemplary embodiments. FIG. 21 illustrates many services that may be available to a residential customer via the customer's home gateway. The customer, for example, may access VoIP, Femtocell, Video-on-Demand (VoD), Off-the-Air TV, and Over-the-Top TV (Flickr, YouTube, etc.). The customer's gateway may also access a DLNA Media Server with Network Backup (photos, music and video), Professionally Monitored Home Security service, Remote Video Monitoring, Home Automation and Control, Web Remote Access, and an Alerts service executing rules. The customer's gateway may also access Local Video Storage, Network Video Storage, Remote Utility Meter Reading, Energy Management, and Telehealth services. Any of these services can be offered everywhere (e.g., ADSL, VDSL, PON or Bring-Your-Own-Broadband).

FIGS. 22-25 are schematics illustrating various architectures for a professionally monitored Home Security System, according to exemplary embodiments. The residential security system may have all wired sensors, all wireless sensors, and/or any combination of wired and wireless sensors. FIGS. 22-25 illustrate an Alarm Management application in the services gateway that is the service logic. The services gateway replaces the traditional Home Security cabinet. When a user puts the system into an "armed" state via a wall mounted keypad, Wi-Fi Touch Pad, Mobile Device or PC, the application monitors the status of wired and/or wireless sensors, such as window contacts, door contacts, motion detectors, glass breakage and smoke/CO detector. When the system is "armed" and a sensor is activated, an alarm condition is established and the alarm information is automatically communicated to the central monitoring station 102 via IP signaling over a 3G cellular packet data service (GPRS, EDGE, UMTS and HSPA). If 3G cellular packet data service is not available, then the customer's wired broadband data service is used. If the customer's broadband data service is not available, then alarm messages are sent via SMS. Wireless sensors are individually monitored within the home by the application. Wired sensors may be individually monitored (star wiring) or may be monitored as a "zone" (daisy chain wiring with multiple sensors in a zone), which includes typically multiple sensors, by the application.

The alarm message 132 contains any alarm information and communicates to the central monitoring station 102. The alarm message 132, for example, may include information identifying the customer's account and the sensor that was activated or the zone that contains the sensor that was activated. A customer will automatically be notified via SMS, email or a VoIP call when an alarm is communicated to the central monitoring station 102. As soon as the alarm information is received by the central monitoring station 102, the agent 151 will immediately attempt to contact the customer to verify that it is a real alarm and not a false alarm. If the agent is successful in contacting the customer and verifies that it is a real alarm condition, then the agent will contact the fire department, police department or EMS. In general if the agent is not successful in contacting the customer to verify that it is a real alarm condition, then the agent will contact the fire department, police department or EMS. During an alarm condition if Remote Video Monitoring is available in the customer's home and the agent has permission to access the Remote Video Monitoring, then the agent will access the cameras 110 in the customer's home to assist in verifying that it is a real alarm condition.

The home security sensors 108 are utilized to monitor for intrusion and fire/smoke. The sensors may be wired and/or wireless. Sensors for intrusion monitoring can include window contacts, door contacts, motion detectors, and glass breakage. Sensors for fire/smoke monitoring can include smoke detector, temperature sensor, and carbon monoxide detector. Wired sensors may be individually monitored (star wiring) or may be monitored as a "zone" (daisy chain wiring with multiple sensors in a zone), which includes typically multiple sensors, and receive power over the wire. Wireless sensors are individually monitored within the home and may be battery powered or AC powered with battery backup.

The Services Gateway may be equipped with a minimum of 24 hour battery backup. During local power failure conditions the battery will power the Services Gateway and some sub-systems automatically may be shutdown to preserve battery life, such as an optional hard drive. Software in the Services Gateway will automatically monitor the health of the battery, which over the life of the battery will constantly be going through charging and discharging cycles. The customer will be automatically be notified when the battery needs to be replaced. The battery will be replaceable by the customer.

Figure 26:
Figure 27:
FIGS. 27-28 are schematics illustrating the live video data 264, according to exemplary embodiments.

FIGS. 26-27 are schematics illustrating the live video data 264, according to exemplary embodiments. The live video data 264 may be produced in a graphical user interface. The user has access to streaming video and/or audio from IP cameras installed in the home network via a mobile device or PC when they are in the home or away from the home. The IP cameras may be connected via a wired connection (e.g., Ethernet, HPNA, HomePlug or G.hn) or a wireless connection (e.g., 802.11a/b/g/n) to the home network. At the time of installation the devices are discovered and bound to the Remote Video Monitoring application. When the user accesses the application via their mobile device or PC they are presented a list of the thumbnail images from the cameras that are available for viewing on the home network. As FIG. 27 illustrates, the user selects the camera 110 that they want to view and a pop-up window appears for the selected camera. The pop-up window displays the streaming video from the selected camera and if the camera is equipped with controls, such as tilt, pan, zoom or brightness, the controls appear in the pop-up window. The pop-up window also contains Video Capture Controls which enable a user to capture a Still Image or Motion Video Clip that is transmitted to local storage on a hard drive in the AT&T Services Gateway and/or to network storage. If a camera is capable of streaming video and audio, then when accessing a camera a user will see streaming video and hear audio. If a camera is capable of streaming video and audio and the user uses the Video Capture Controls to capture a Motion Video Clip, the clip will contain streaming video and audio.

The AT&T Services Gateway can optionally be equipped with the mass storage device, such as a hard drive or Network Attached Storage, for automatically storing and archiving streaming video from some or all of the IP cameras in the home. The video can be stored on a First In and First Out basis (the storage capacity at a minimum will be sized to support multiple days of storage) or video can be stored until the maximum storage capacity is reached (assumes that user will have to manage storage by periodically deleting stored video). A search function is provided so that a user can easily locate stored video based on date, time of day and IP camera. The storage includes an index of alarm reporting to the central monitoring station 102 so that a user can easily locate pre- and post-alarm video associated with an alarm report to the central monitoring station 102.

Exemplary embodiments may also include network video storage. Streaming video from some or all of the IP cameras in the home can automatically be stored and archived in the network (due to the upstream bandwidth that would be required, local storage will be more common than network storage). The video can be stored in the network on a First In and First Out basis (the storage capacity at a minimum will be sized to support multiple days of storage) or video can be stored until the maximum storage capacity is reached (assumes that user will have to manage storage by periodically deleting stored video). A search function is provided so that a user can easily locate stored video based on date, time of day and IP camera. The storage will include an index of alarm reporting to the central monitoring station 102 so that a user can easily locate pre- and post-alarm video associated with an alarm report to the central monitoring station 102.

Exemplary embodiments may report alarms using Cellular Packet Data (GPRS, EDGE, UMTS or HSPA) as the primary signaling path to the central monitoring station 102 for reporting intrusion and fire alarms. On a periodic basis, such once per day or once per hour due to the packet protocol, the central monitoring station 102 may "ping" the AT&T Services Gateway in a customer's home to verify that the signaling path is in operation. If multiple pings are not successful then a trouble condition will automatically be reported to an AT&T Network Operations Center. If a ping fails, more frequent pings may be attempted. If the more frequent pings are still unsuccessful, then a diagnostic routine may commence to determine a fault. Exemplary embodiments may revert to SMS, and the data network 104 may prioritize SMS alarm messages. Because SMS is usually best effort, exemplary embodiments may prioritize SMS alarm messages and confirm delivery.

The central monitoring station 102 may thus capture video during alarm conditions. If the customer's home is equipped with cameras for Remote Video Monitoring, a specified amount of streaming video, such as ten seconds, is automatically being buffered in memory on a first in and first out basis in memory on the AT&T Services Gateway from each camera. During an alarm condition, which is detected by the Alarm Management and central monitoring station Reporting application executing on the AT&T Services Gateway, the buffered streaming video clips on the AT&T Services Gateway will automatically be transmitted to an online electronic file storage system in the central monitoring station and the agent in the central monitoring station who is assigned to handle alarm will be notified that video is available. Because the video is being buffered on a continuous basis the streaming video clips that are sent to the central monitoring station will include both pre-alarm and post-alarm video, e.g., if a ten second video clip is sent it could include five seconds of pre-alarm video and five seconds of post-alarm video. The video clips that are automatically sent to the central monitoring station will be a tool for the agent to use in determining if the alarm is real or is a false alarm, in addition the agent may be provided access to live video from the home during the alarm condition.

Exemplary embodiments include conferencing capability during alarm conditions. When an alarm is received in the central monitoring station and assigned to an agent, the agent will immediately attempt to determine if the alarm is a real alarm or a false alarm, in general 99% of alarms reports to central monitoring stations are false alarms. Typically the first thing that an agent will do is attempt to contact the customer by phone by placing a call to the customer's home phone number and if that call is not successful they will proceed calling numbers on a list that the customer has provided. If the agent is successful in contacting the customer by phone and the customer has a device telephone capable of IMS multimedia conferencing, such as a mobile device that is IMS multimedia conferencing enabled, then the agent can establish an IMS multimedia session and the agent and the customer can jointly be viewing streaming video from cameras in the customer's home in order to determine if the alarm is real. The IMS multimedia conference could be expanded to include additional parties, such as police, fire and/or medical personnel. The purpose of the IMS multimedia conferencing during alarm conditions is to assist the agent in the central monitoring station in determining if the alarm that has been received is real.

Exemplary embodiments may also include home automation and control. Home Automation & Control includes devices for monitoring and/or controlling the environment. Devices can include temperature sensors where the user can be notified via SMS, email or voice if the temperature is above a temperature specified by the user or below a temperature specified by the user. Water detectors may also notify the user via SMS, email or voice if water is detected. A remote control water shut-off valve may be remotely opened and closed via a mobile device or PC, and the user is notified when water is detected and shuts off the water. Power modules may control lighting and appliances, whereby the user can easily establish programs for automatically controlling lighting and appliances and user can remotely via a mobile device or PC turn lighting and appliances on and off. Home Automation & Control includes devices may also include thermostats, remote control door locks, garage door openers, and remote control windows and shades. Any sensor can trigger an event which can automatically be communicated to a user via a mobile device or PC and/or can be used to control devices, e.g., when a user disarms the security system and it is nighttime, automatically turn on lighting and change a thermostat setting.

Exemplary embodiments may also provide notification of events. When any event occurs in the home, such as the reporting of an alarm to the central monitoring station or simply the opening of a door, the customer can automatically be notified of the event by SMS/MMS, email and/or voice calling. If the customer's home is equipped with cameras for Remote Video Monitoring, then a still video image can also be included via a MMS or attachment to email. A customer via a simple web interface will be able to link events and actions, e.g., when the security alarm is dis-armed automatically turn on selected lights in the home and change the thermostat setting or if an alarm is triggered turn on all of the lights in the home and send an SMS and email to the customer.

Figure 28:
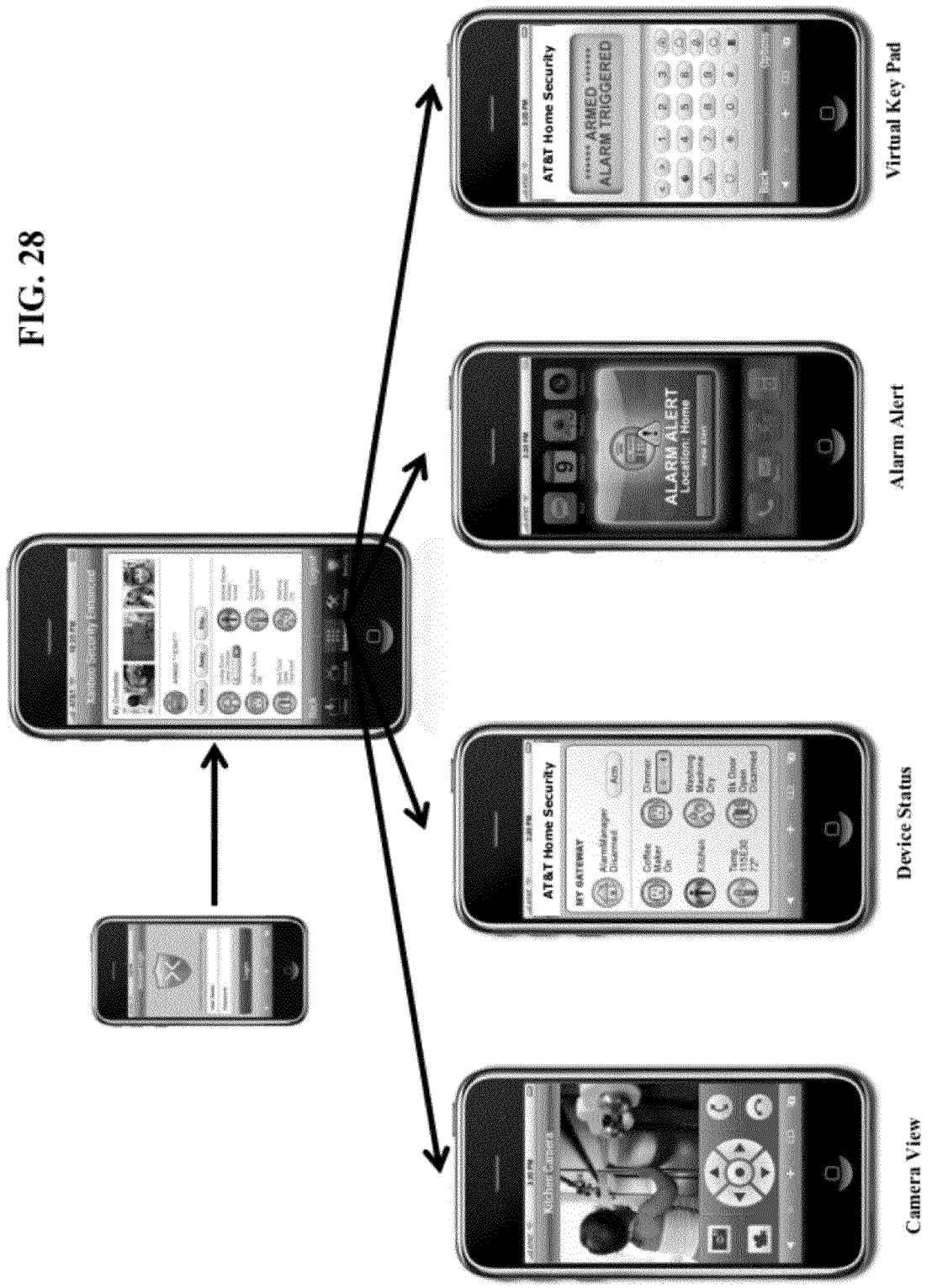
Figure 29:
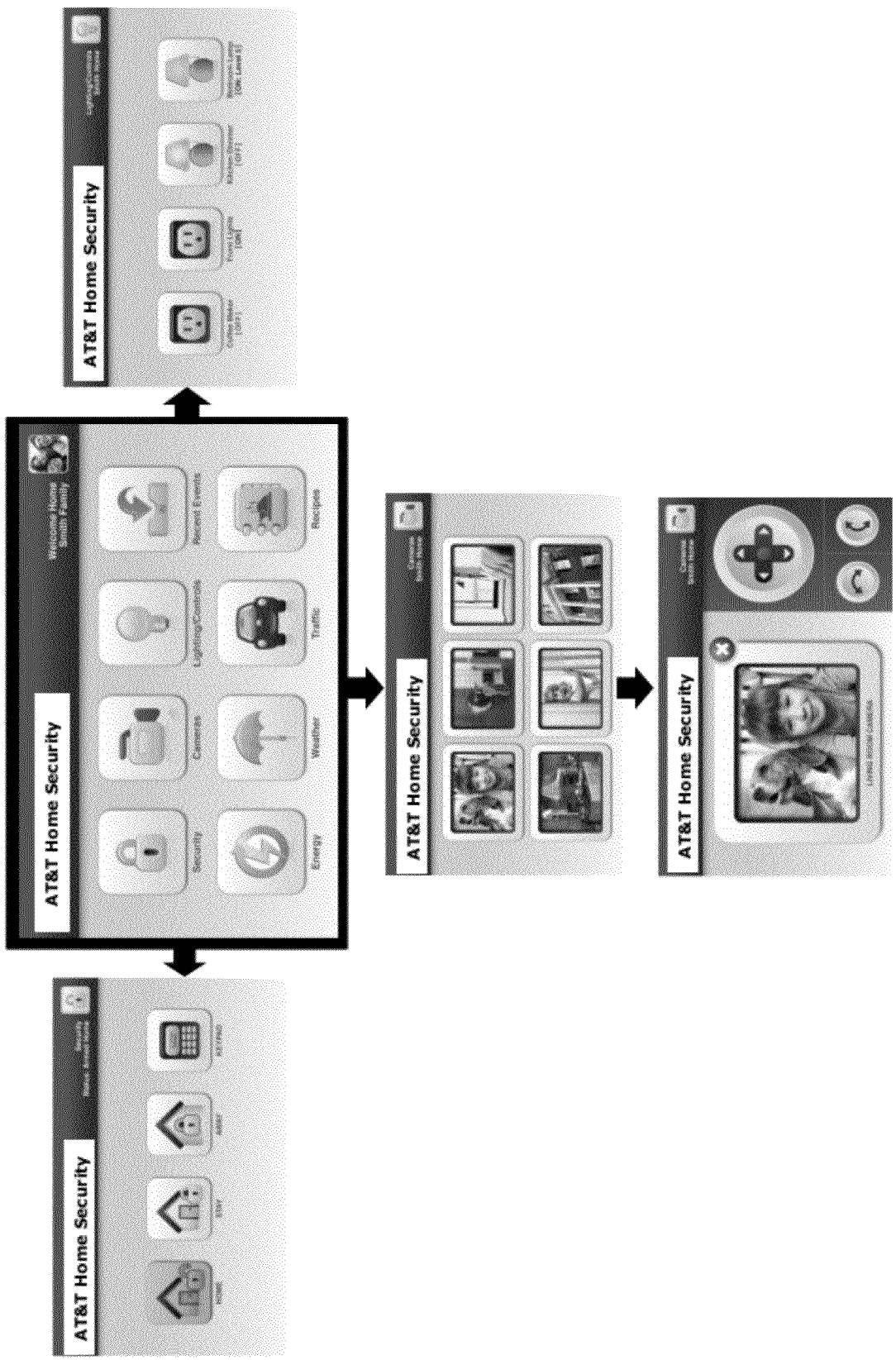
FIGS. 29-31 are schematics illustrating various graphical user interfaces, according to exemplary embodiments.
Figure 30:

FIGS. 28-30 are schematics illustrating various graphical user interfaces, according to exemplary embodiments. FIG. 28 illustrates various mobile interfaces for smart devices, such as the APPLE® IPHONE®. FIG. 29 illustrates a user-friendly touch pad interface with selective icons for functions. FIG. 30 illustrates a larger, more comprehensive computer interface for larger display screens.

Exemplary embodiments thus eliminate the traditional home security panel for the Home Security application because the service logic for home security executes on the AT&T Services Gateway in the form of a software application. The basic system comprises the AT&T Services Gateway in conjunction with an Alarm Management and central monitoring station Reporting application and wireless and/or wired devices in the home, including keypads, sirens and sensors. All of the wireless devices in the home associated with the Home Security application may be based on an open systems wireless technology, such as ZigBee (www.zigbee.org) or proprietary wireless technology, such as that used by Honeywell, DSC, Xanboo and others. A user can be automatically be notified via SMS, email or voice of any event that occurs in the home, including the reporting of an alarm to the central monitoring station. Wireline and wireless connectivity is constantly being monitored to the home via a network platform. During an alarm condition a central monitoring station agent can utilize IMS multimedia conferencing capabilities to enable the agent, customer and police/fire/EMS personnel to simultaneously view streaming video/audio from the home and/or stored streaming video/audio.

Exemplary embodiments may be applied regardless of networking environment. The data network 104 may be a cable network operating in the radio-frequency domain and/or the Internet Protocol (IP) domain. The data network 104, however, may also include a distributed computing network, such as the Internet (sometimes alternatively known as the "World Wide Web"), an intranet, a local-area network (LAN), and/or a wide-area network (WAN). The data network 104 may include coaxial cables, copper wires, fiber optic lines, and/or hybrid-coaxial lines. The data network 104 may even include wireless portions utilizing any portion of the electromagnetic spectrum and any signaling standard (such as the I.E.E.E. 802 family of standards, GSM/CDMA/TDMA or any cellular standard, and/or the ISM band). The data network 104 may even include powerline portions, in which signals are communicated via electrical wiring. The concepts described herein may be applied to any wireless/wireline communications network, regardless of physical componentry, physical configuration, or communications standard(s).

Figure 31:
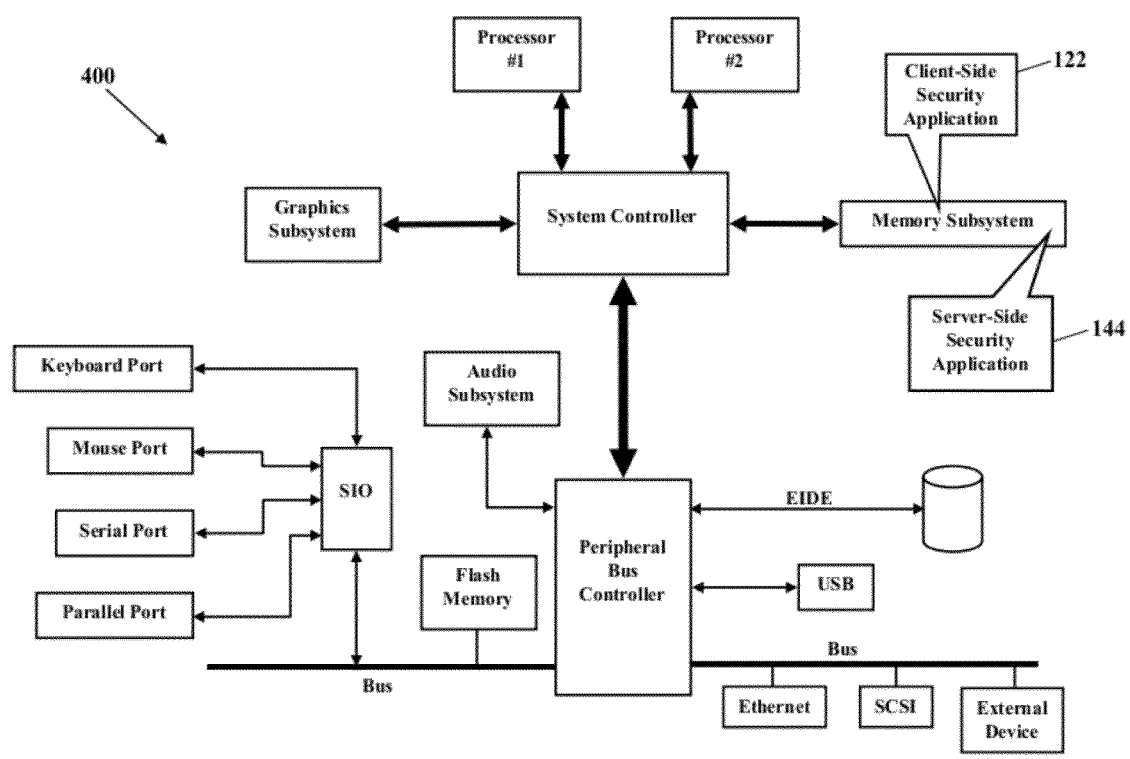

FIG. 31 is a schematic illustrating still more exemplary embodiments. FIG. 31 is a generic block diagram illustrating the client-side security application 122 and/or the server-side security application 144 may operate within a processor-controlled device 400. The client-side security application 122 and/or the server-side security application 144 may be stored in a memory subsystem of the processor-controlled device 400. One or more processors communicate with the memory subsystem and execute the client-side security application 122 and/or the server-side security application 144. Because the processor-controlled device 400 illustrated in FIG. 31 is well-known to those of ordinary skill in the art, no detailed explanation is needed.

Figure 32:
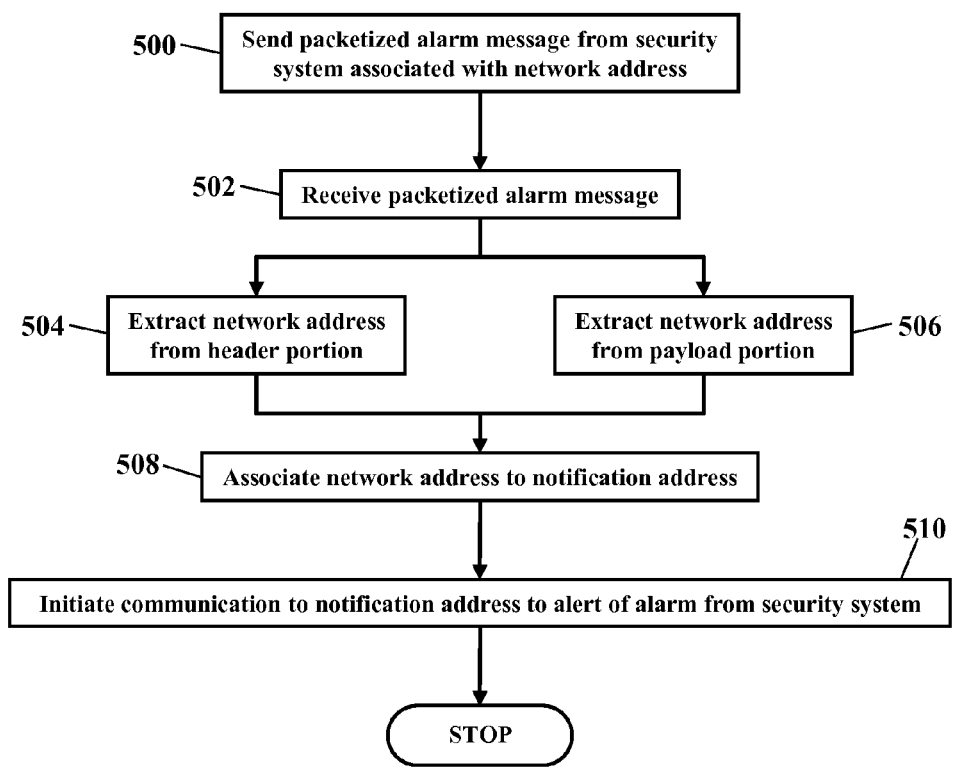
FIG. 32 is a schematic illustrating a generic block diagram of a processor-controlled device, according to exemplary embodiments.

FIG. 32 is a flowchart illustrating a method of providing security services. A packetized alarm message 132 is sent over a data network 104 from a security system 100 associated with a network address 150 (Block 400). The packetized alarm message 132 is received (Block 402). The network address 150 may be extracted from a header portion (Block 504) and/or a payload portion (Block 506) of the packetized alarm message 132. The network address 150 is associated to a notification address 152 (Block 508). A communication is initiated over the data network 104 to the notification address 152 to alert of an alarm from the security system 100 (Block 510).

Figure 33:
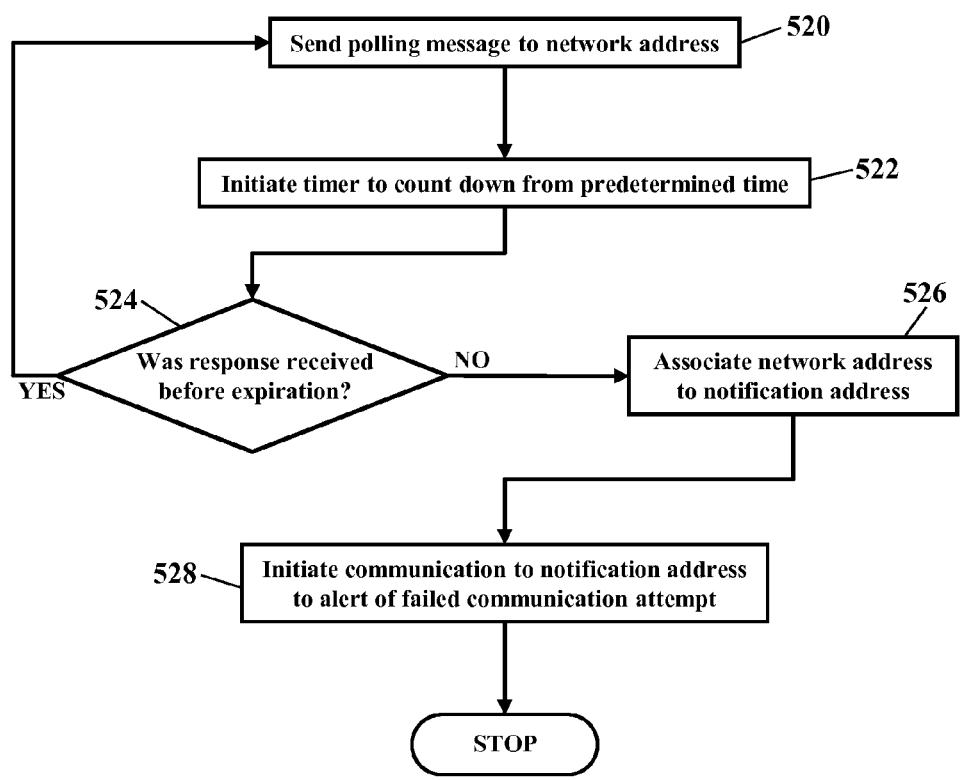
FIGS. 33-34 are flowcharts illustrating a method of providing security services, according to exemplary embodiments.

FIG. 33 is another flowchart illustrating the method of providing security services. A polling message is periodically sent over the data network 104 to a network address (Block 520). A timer is initiated and counts down from a predetermined time (Block 522). If a response is not received within expiration of the timer (Block 524), then the network address is associated to a notification address (Block 526). A communication is then initiated to alert of a failed communication attempt (Block 528).

Figure 34:
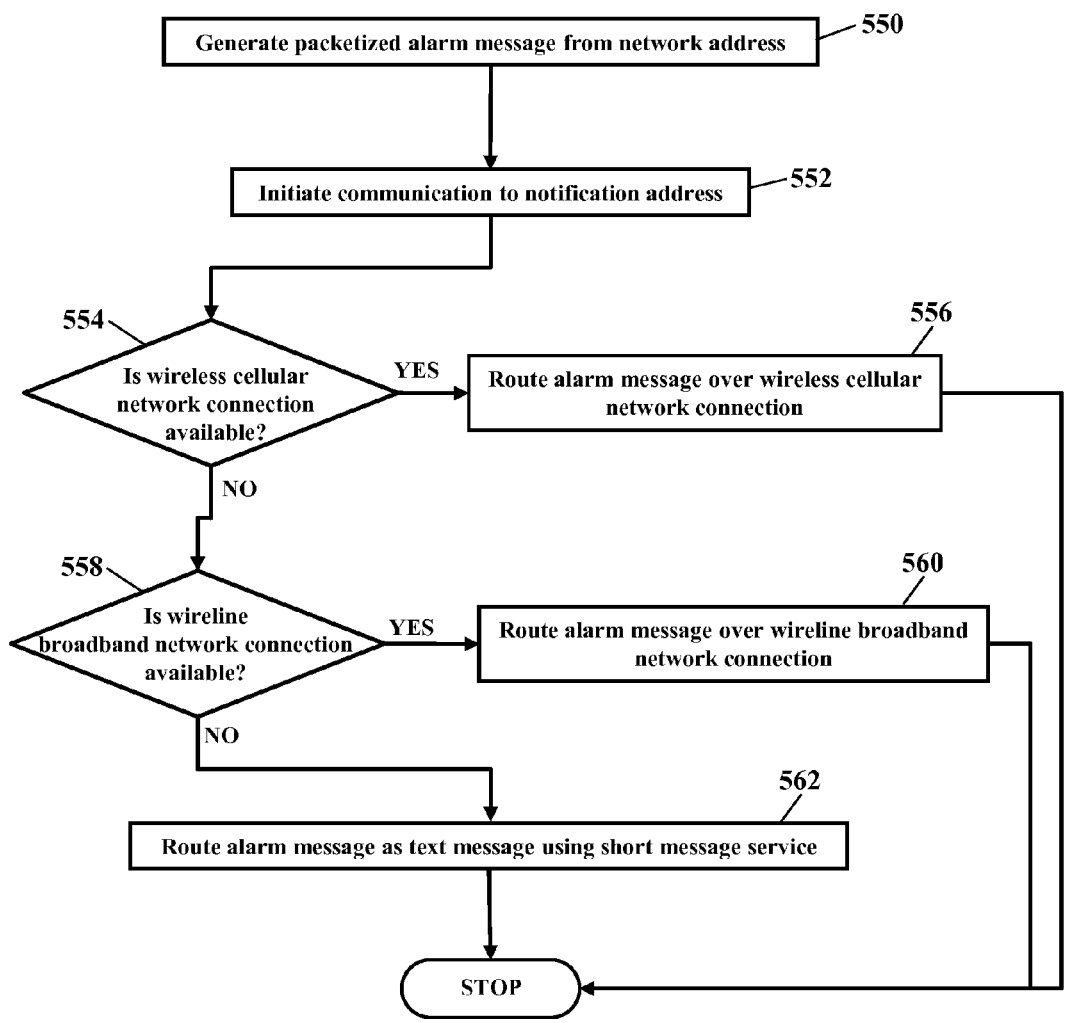

FIG. 34 is another flowchart illustrating the method of providing security services. The packetized alarm message 132 is generated (Block 550). Communication is initiated over the data network 104 to the notification address 152 (Block 552). If the wireless cellular network connection is available (Block 554), the alarm message 132 is routed over the wireless cellular network connection (Block 556). When the wireless cellular network connection is unavailable (Block 754), and if a wireline broadband network connection is available (Block 558), then the alarm message 132 is routed over the wireline broadband network connection (Block 560). If the wireline broadband network connection is unavailable to the data network (Block 558), then the alarm message 132 is sent as a text message using short message service (Block 562).

Exemplary embodiments may be physically embodied on or in a computer-readable storage medium. This computer-readable medium may include CD-ROM, DVD, tape, cassette, floppy disk, memory card, and large-capacity disks. This computer-readable medium, or media, could be distributed to end-subscribers, licensees, and assignees. These types of computer-readable media, and other types not mention here but considered within the scope of the exemplary embodiments. A computer program product comprises processor-executable instructions for alerting of alarms from security systems.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

What is claimed is:

1. A system, comprising:
   a processor; and
   memory storing code that when executed causes the processor to perform operations, the operations comprising:
   receiving a polling message at a security system;
   retrieving a hybrid polling scheme that tests multiple connection mechanisms to a security system, the hybrid polling scheme testing the multiple connections with a single polling cycle, the multiple connections selected from a wireless cellular network connection, a wireline broadband network connection, and a short message service;
   forcing a single response to the polling message, the single response selected from:
   a wireline response over the wireline broadband network connection in response to receipt of the polling message over one of the wireless cellular network connection and the short message service;
   a wireless response over the wireless cellular network connection in response to receipt of the polling message over one of the wireline broadband network connection and the short message service;
   a short message service response using the short message service in response to receipt of the polling message over one of the wireline broadband network connection and the wireless cellular network connection;
   determining dual connectivity based on successful receipt of the single response;
   detecting an alarm in the security system;
   retrieving an Internet protocol network address to notify of the alarm; and sending a packetized alarm message.

2. The system according to claim 1, wherein the operations further comprise receiving confirmation that the single response was received.

3. The system according to claim 1, wherein the operations further comprise receiving a response that indicates the wireline broadband network connection is available.

4. The system according to claim 1, wherein the operations further comprise receiving a response that indicates a short message service is available.

5. The system according to claim 1, wherein the operations further comprise storing the Internet Protocol address.

* * * * *